US012730763B2

(12) United States Patent
Cai et al.

(10) Patent No.: US 12,730,763 B2
(45) Date of Patent: Sep. 8, 2026

(54) MECHANISMS FOR PROCESSING MEMORY REQUESTS BASED ON CRITICALITY

(71) Applicant: Apple Inc., Cupertino, CA (US)

(72) Inventors: Qiong Cai, Menlo Park, CA (US); Tyler J. Huberty, Sunnyvale, CA (US); Anwar Q. Rohillah, Dublin, CA (US); Gregory S. Mathews, Saratoga, CA (US); Wolfgang H. Klingauf, Morgan Hill, CA (US); Rohit K. Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/978,516

(22) Filed: Dec. 12, 2024

(65) Prior Publication Data

US 2026/0086957 A1 Mar. 26, 2026

Related U.S. Application Data

(60) Provisional application No. 63/697,112, filed on Sep. 20, 2024.

(51) Int. Cl.
*G06F 13/16* (2006.01)
*G06F 12/1045* (2016.01)

(52) U.S. Cl.
CPC ...... *G06F 13/1626* (2013.01); *G06F 12/1045* (2013.01); *G06F 13/1642* (2013.01)

(58) Field of Classification Search
CPC .. G06F 13/18; G06F 12/1045; G06F 13/1642; G06F 13/1626
See application file for complete search history.

(56) References Cited

U.S. PATENT DOCUMENTS 9,323,678 B2 4/2016 Kumar et al.
9,690,705 B1 6/2017 Adda et al.
(Continued)

FOREIGN PATENT DOCUMENTS

CN 100456232 C 1/2009
CN 116185310 B 7/2023
(Continued)

OTHER PUBLICATIONS

Z. Wang, Q. Zuo and J. Li, "An Intelligent Multi-Port Memory," 2008 International Symposium on Intelligent Information Technology Application Workshops, Shanghai, China, 2008, pp. 251-254 (Year: 2008).*
(Continued)

*Primary Examiner* — Reginald G Bragdon
*Assistant Examiner* — Zakaria Mohammed Belkhayat
(74) *Attorney, Agent, or Firm* — Kowert, Hood, Munyon, Rankin & Goetzel, P.C.; Mark D. Seegers; Dean M. Munyon

(57) ABSTRACT

In an embodiment, a computer system includes a memory system configured to couple to one or more memory devices and processor circuitry configured to issue read and write requests to the memory system. The memory system is configured to receive, during a write turn in which a plurality of write requests are processed, a read request and an indication of a criticality of the read request assigned by the processor circuitry. The memory system is further configured to, based on the indication identifying that the read request is a critical read request and a detection that a set of activation criteria is satisfied, transition, to process the critical read request, from the write turn to a read turn without completing the write turn. The memory system is configured to perform the read turn in which a plurality of
(Continued)

read requests are processed including the critical read request.

17 Claims, 12 Drawing Sheets

(56) References Cited

U.S. PATENT DOCUMENTS

| | | | | |
|---|---|---|---|---|
| 10,437,758 | B1 * | 10/2019 | Mathews | G06F 13/18 |
| 10,705,975 | B2 | 7/2020 | Coburn et al. | |
| 11,868,628 | B2 | 1/2024 | Jain et al. | |
| 11,907,528 | B2 | 2/2024 | Chirca et al. | |
| 11,943,351 | B2 | 3/2024 | Ansari et al. | |
| 2003/0093636 | A1 * | 5/2003 | Henry | G06F 12/0802 711/158 |
| 2007/0147142 | A1 | 6/2007 | Schnell et al. | |
| 2013/0124805 | A1 * | 5/2013 | Rafacz | G06F 13/1642 711/E12.001 |
| 2018/0088944 | A1 | 3/2018 | Subramanian et al. | |
| 2018/0349300 | A1 * | 12/2018 | Bubb | G06F 3/061 |
| 2020/0057579 | A1 * | 2/2020 | Mathews | G06F 3/0673 |
| 2020/0133905 | A1 | 4/2020 | Mathews et al. | |
| 2020/0159463 | A1 | 5/2020 | Mathews et al. | |
| 2023/0060225 | A1 | 3/2023 | Huberty et al. | |
| 2023/0066236 | A1 * | 3/2023 | Huberty | G06F 12/127 |
| 2024/0036736 | A1 * | 2/2024 | Anderson | G06F 13/1626 |

FOREIGN PATENT DOCUMENTS

| | | | |
|---|---|---|---|
| CN | 111176573 | B | 5/2024 |
| JP | 4455673 | B2 | 4/2010 |

OTHER PUBLICATIONS

International Search Report and Written Opinion in PCT Appl. No. PCT/US2025/045771 mailed Jan. 15, 2026, 10 pages.

* cited by examiner

700

Receiving, During Write Turn in Which Plurality of Write Requests are Processed, Read Request and Indication of Criticality of Read Request Assigned by Processor Circuitry
710

Based on Indication Identifying That Read Request is Critical Read Request and Detection That Set of Activation Criteria is Satisfied, Transitioning, to Process Critical Read Request, From Write Turn to Read Turn Without Completing Write Turn
720

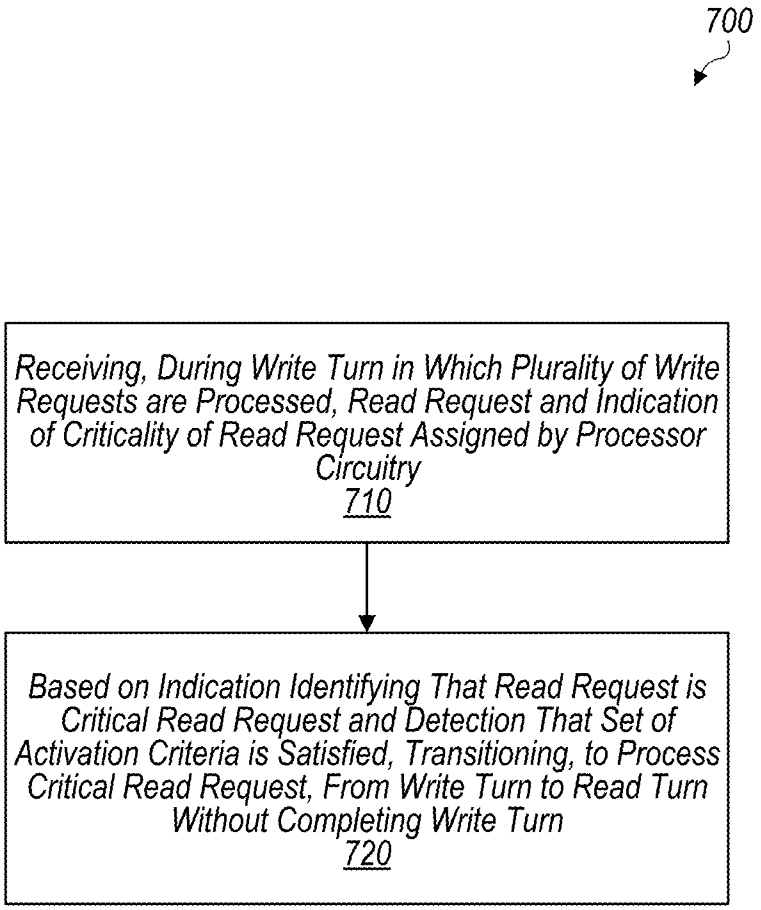

FIG. 7

MECHANISMS FOR PROCESSING MEMORY REQUESTS BASED ON CRITICALITY

PRIORITY CLAIM

The present application claims priority to U.S. Provisional Appl. No. 63/697,112, filed Sep. 20, 2024, which is incorporated by reference herein in its entirety.

BACKGROUND

Technical Field

This disclosure relates generally to integrated circuits and, more specifically, to various mechanisms for processing memory requests based on criticality.

Description of the Related Art

Modern computer systems often include a system on a chip (SOC) that integrates many computer components (e.g., a central processing unit (CPU), a graphics processing unit (GPU), etc.) onto an integrated circuit die. These components are normally coupled to memory devices (e.g., random access memory) of those systems via a memory controller. During operation, the components typically perform read and write transactions that involve accessing those memory devices. For read transactions, the components retrieve data from the memory devices without manipulating the data, but for write transactions, the components manipulate the data and write it back to the memory devices. For example, an SOC may include one or more processors that serve as a CPU that executes control software (e.g., an operating system) and applications that provide user functionality. As a part of implementing a software routine, a processor executes various types of instructions such as load instructions to retrieve values from memory coupled to the processor, arithmetic instructions to manipulate the values, and store instructions to write the values back to memory.

BRIEF DESCRIPTION OF THE DRAWINGS

FIGS. 7-9 are flow diagrams illustrating example methods relating to processing a read request (or more broadly, a memory request) that is identified as critical.

DETAILED DESCRIPTION

Figure 1:
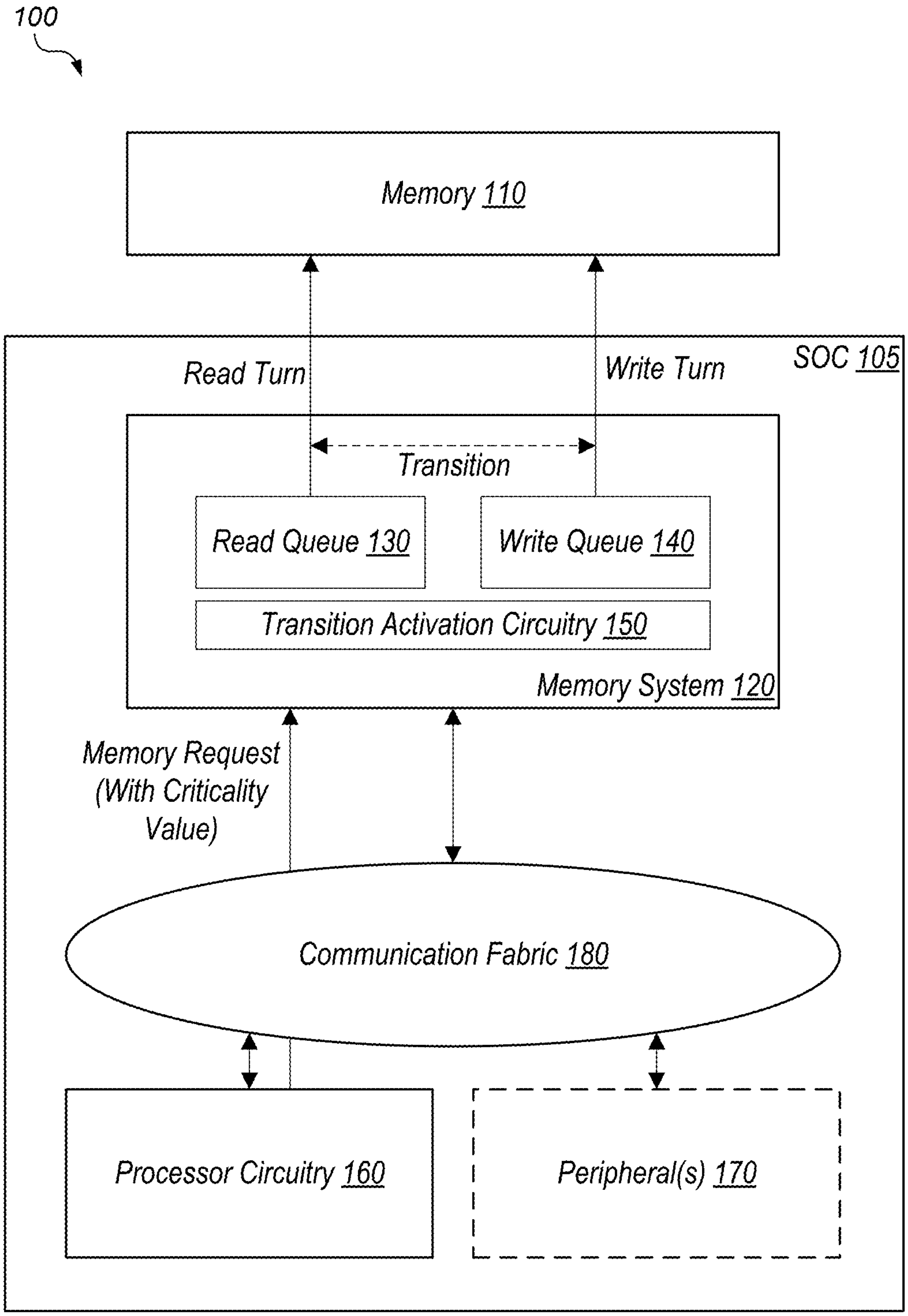
FIG. 1 is a block diagram illustrating one embodiment of a system configured to process memory requests based on criticality.

During operation, a processor executes various types of instructions. These instructions include load instructions to load data from memory. When the processor executes a given load instruction, a memory hierarchy comprising various levels of cache (e.g., L1, L2, etc.) followed by main memory may be checked for the requested data. If the requested data is not located in the lower levels of the memory hierarchy, then eventually the main memory is checked for that data by a memory controller. In certain implementations, the memory controller is configured to transition/switch between a write turn in which multiple writes of data to the main memory are performed and a read turn in which multiple reads of data from the memory are performed. Accordingly, the read request for the data targeted by the load instruction is processed during a read turn.

But there are cases in which a load instruction holds up retirement of other instructions, holds up the advancement of a load queue, or has some material impact on the performance of the system, particularly the processor. Such load instructions may be considered more critical than other load instructions. For example, a load instruction represented at the head of a load queue may be stalling the retirement of other completed instructions or there are a number of instructions stalled due to dependency on the load data (either direct or indirect). Accordingly, the speed at which that load instruction is processed can have an impact on the performance of the system. In various cases, the requested data is not located in the lower levels of the memory hierarchy and thus the main memory has to be checked by the memory controller during a read turn. But the read request for the targeted data may be received at the memory controller during a write turn. This can be particularly problematic if the memory controller just started the write turn and thus the read request may not be processed for a significant amount of time, resulting in a load instruction that is deemed critical taking a while to complete. The present disclosure addresses, among other things, the problem of how to reduce the time involved in processing a load instruction that is deemed critical.

In various embodiments described below, a system comprises a memory system that is configured to couple to one or more memory devices and processor circuitry that is configured to issue read and write requests to the memory system. When issuing a read request, in various embodiments, the processor circuitry assigns a criticality value to that read request, where the criticality value indicates the criticality of the read request. The criticality value may indicate that the read request is non-critical or critical. For example, a read request corresponding to a load instruction represented at the head of a load queue may be assigned a critical value. The read request may be received by the memory system during a write turn in which write requests are processed or a read turn in which read requests are processed. If the read request is received during a read turn, then the read request may be processed by the memory system during that read turn. If the read request is received during a write turn, then the memory system may force a transition from the write turn to the read turn without completing the write turn as planned in response to detecting that the read request is a critical read request. In some embodiments, the memory system always forces a transition from the write turn to the read turn upon receiving a critical read request.

But always forcing a transition to a read turn from a write turn upon receiving a critical read request can cause reduced performance for other traffic. For example, during write heavy periods, a significant number of write requests may be received and stored in a write queue of the memory system. If the memory system forces a transition to a read turn without completing the current write turn as planned, then the write queue may be in danger of becoming full and causing pushback, degrading the performance of write traffic. Accordingly, there can be certain conditions for which it may be desirable to not force a transition to a read turn from the current write turn. In various embodiments, in response receiving a critical read request, the memory system determines whether a set of activation criteria is met, indicating that a forced transition to a read turn without completing the current write turn is permitted. One criterion may be that a write fill level for the write queue is not exceeding a certain threshold (indicating a period of heavy writes) when the critical read request is received. If at least one of the activation criteria is not met, in various embodiments, the memory system does not force a transition but instead allows the write turn to complete as planned. If the activation criteria are met, then the memory system may force a transition to a read turn in order to process the critical read request. While read requests are described as being critical/non-critical, in some embodiments, write requests can be deemed critical/non-critical and thus assigned a criticality value that the memory system may assess (e.g., in view of activation criteria) to determine whether to force a transition from a read turn to a write turn.

These techniques may be advantageous as they allow for load instructions that may be considered critical to be processed quicker while also ensuring that other aspects, such as write traffic, are not unduly affected. For example, by allowing a read request to be classified as a critical read request (e.g., by processor circuitry) and the memory system to force a transition from a write turn to a read turn, the read request may not have to wait as long to be processed, especially in the case in which the read request is received by the memory system at the start of a write turn. As a result, the corresponding load instruction can be completed sooner than if read requests were not classified as critical or non-critical. Furthermore, by assessing activation criteria to determine whether a forced transition is permitted, the memory system may ensure that other traffic processed by the memory system is not unreasonably affected. For example, by ensuring that a write queue is not in danger of becoming full if a forced transition happens, the memory system may prevent back pressure from building up on the write traffic side. As such, the disclosed techniques improve the functioning of a computer system and provide an improvement to the field of computer architecture.

Turning now to FIG. 1, a block diagram of one embodiment of a system 100 is shown. System 100 may be any type of hardware-based system, such as a desktop computer, a laptop computer, a tablet computer, a cellular or mobile phone, etc. Examples of different types of systems that can correspond to system 100 are discussed in more detail with respect to FIG. 11. In the illustrated embodiment, system 100 comprises an SOC 105 that is coupled to a memory 110. As shown, SOC 105 includes a memory system 120, processor circuitry 160, peripheral(s) 170, and a communication fabric 180 that couples components 120, 160, and 170 together. As further shown, memory system 120 includes a read queue 130, a write queue 140, and transition activation circuitry 150.

System 100 may be implemented differently than shown. For example, SOC 105 may include a display controller, power management circuitry, etc. It is also noted that the number of components of system 100 (and the number of subcomponents for those shown in FIG. 1, such as within memory system 120) may vary between embodiments. Accordingly, there may be more or fewer of each component or subcomponent than the number shown in FIG. 1. For example, SOC 105 may couple to multiple memory devices via multiple memory systems 120 that may be included in SOC 105.

SOC 105 in various embodiments, integrates various components (e.g., memory system 120, processor circuitry 160, etc.) onto a single semiconductor substrate as an integrated circuit chip and hence is referred to as a system on a chip (SOC). In some embodiments, however, the components are implemented on two or more discrete chips that are coupled together in system 100. For the case of discussion, various embodiments in this disclosure are described as being implemented using one or more SOCs. But it is to be understood that any disclosed SOC can also be implemented using a chiplet-based architecture. Wherever the term "SOC" appears in this disclosure, the references are intended to suggest alternate embodiments in which the same functionality is implemented via a less monolithic architecture such as using multiple dies that can be included in a single integrated assembly package in some embodiments.

Architectures in which there are multiple dies are to be understood to encompass both homogeneous designs (in which each die includes identical or almost identical functionality) and heterogeneous designs (in which the functionality of each die diverges more considerably). This disclosure further contemplates embodiments in which the functionality of multiple SoCs are implemented using different levels of discreteness. For example, the functionality of a first system could be implemented on a single IC, while the functionality of a second system (which could be the same or different than the first system) could be implemented using a number of co-packaged dies/chiplets.

Memory 110, in various embodiments, may be used to store data and program instructions that are executable by components of SOC 105 (e.g., processor circuitry 160) to cause system 100 to implement operations described herein. Memory 110 may be implemented via different physical memory media, such as hard disk storage, floppy disk storage, removable disk storage, flash memory, random access memory (RAM-SRAM, EDO RAM, SDRAM, DRAM, etc.), read only memory (PROM, EEPROM, etc.), etc. The memory that is available to SOC 105 is not limited to memory 110. Rather, SOC 105 can include other forms of storage such as a memory cache in memory system 120 and/or cache memory (e.g., L1 cache, L2 cache, etc.) within other components (e.g., processor circuitry 160) of SOC 105.

Memory system 120, in various embodiments, includes circuitry configured to receive, from other components (e.g. processor circuitry 160) of SOC 105, memory requests to perform memory operations and access memory 110 to complete those memory operations. Memory system 120 may include a memory controller and be configured to access any type of memory 110. In various embodiments, memory system 120 includes queues (e.g., read queue 130 and write queue 140) for storing memory requests (memory operations), ordering (and potentially reordering) them, and presenting them to memory 110. Memory system 120 may also include data buffers to store write data awaiting to be written to memory 110 and read data awaiting to be returned to the source of a memory operation. In various embodiments, memory system 120 includes a memory cache that is used to store recently accessed memory data, which may avoid re-access of data from memory 110 if it is expected to be accessed again soon. This memory cache can also be referred to as a system cache, as opposed to private caches (e.g., L1 caches) in processor circuitry 160 that serve only particular components. In some embodiments, this system cache is not located within memory system 120.

Read queue 130 and write queue 140, in various embodiments, include circuitry that is configured to store read and write memory requests, respectively. A read memory request may result in data being accessed from memory 110, and a write memory request may result in data being written to memory 110. Generally, "data" is used herein in the generic sense to refer to both instruction data that is fetched by, e.g., processor circuitry 160 for execution and data read/written by, e.g., processor circuitry 160 due to execution of the instructions (e.g., operand data and result data), particularly when referring to cache lines of data. In response to receiving a memory request, memory system 120 may enqueue/store the received memory request in the appropriate queue (e.g., a write memory request in write queue 140). In various embodiments, read queue 130 and write queue 140 are configured to store memory requests based on an order in which they are received. Read queue 130 and write queue 140, however, may be configured to prioritize certain stored memory requests over other stored memory requests. As discussed in more detail with respect to FIG. 4, read queue 130 and write queue 140 may provide memory requests to arbitration circuitry that arbitrates between the memory requests to issue to memory 110. Also, read queue 130 and write queue 140 may provide status information that indicates the number of valid entries in the respective queue. Moreover, in some embodiments, multiple read queues 130 and/or write queues 140 may be implemented for different types of traffic, as discussed in greater detail with respect to FIG. 4.

In various embodiments, memory system 120 implements write turns and read turns to process memory requests. Memory system 120 may process one or more write requests during a write turn and one or more read requests during a read turn. In various embodiments, memory system 120 is configured to alternate between write turns and read turns. Memory system 120 may determine, for a set of memory requests, how many of those requests should be allocated to writes in a write turn and reads in a read turn based on, e.g., current queue levels, historical traffic, etc. For example, if write queue 140 is nearly full and read queue 130 is nearly empty, memory system 120 may process, during an instance of a write and a read turn, substantially more write memory requests than read memory requests—that write turn may consume more cycles than the read turn or vice versa in other cases. In various embodiments, memory system 120 is configured to force a transition from one turn (e.g., a write turn) to another turn (e.g., a read turn) before completing the former, planned turn in certain scenarios. As an example, if a read request is received that is deemed critical, memory system 120 may transition from a write turn to a read turn without completing the write turn as originally planned.

Transition activation circuitry 150, in various embodiments, is configured to determine whether a forced transition should occur and accordingly cause the forced transition to happen if it should. Transition activation circuitry 150 may determine whether to force a transition in response to receiving a memory request that is deemed critical. As discussed in greater detail with respect to FIGS. 2 and 3, processor circuitry 160 may provide an indication of the criticality of a memory request, where the criticality of the memory request may be based on a position of the corresponding instruction in a queue. In response to receiving a memory request deemed critical, in various embodiments, transition activation circuitry 150 determines whether one or more activation criteria are met, indicating that a forced transition is permitted. The activation criteria are discussed in greater detail with respect to FIGS. 4-6. In response to determining that a forced transition is permitted, transition activation circuitry 150 may cause memory system 120 to transition to the next turn without completing the current turn. By transitioning to the next turn without completing the current turn, memory system 120 may process the received memory request sooner than if memory system 120 completed the current turn.

Processor circuitry 160, in various embodiments, includes one or more processors that serve as a CPU of SOC 105. Those processors may execute the main control software of the system, such as an operating system. Generally, software executed by the CPU during use controls the other components of the system to realize the desired functionality of the system. The processors may also execute other software, such as application programs. An application program may provide user functionality and rely on the operating system for lower-level device control, scheduling, memory management, etc. As such, the processors can also be referred to as application processors. Processor circuitry 160 may include one or more processors that serve as a GPU of SOC 105 or a different type of processing unit. In various embodiments, processor circuitry 160 includes other hardware such as an L2 cache and/or an interface to the other components of the system (e.g., an interface to communication fabric 180). As discussed in greater detail with respect to FIG. 2, processor circuitry 160 can include a last level cache that is configured to assign one of multiple criticality values to memory requests when issuing them to memory system 120.

Peripherals 170, in various embodiments, are sets of additional hardware functionality included in SOC 105. For example, peripherals 170 may include video peripherals such as an image signal processor configured to process image capture data from a camera or other image sensor, GPUs, video encoder/decoders, scalers, rotators, blenders, display controllers, etc. As other examples, peripherals 170 may include audio peripherals such as microphones, speakers, interfaces to microphones and speakers, audio processors, digital signal processors, mixers, etc. Peripherals 170 may include interface controllers for various interfaces external to SOC 105, such as Universal Serial Bus (USB), peripheral component interconnect (PCI) including PCI Express (PCIe), serial and parallel ports, etc. Peripherals 170 may also include networking peripherals such as media access controllers (MACs).

Communication fabric 180 may be any communication interconnect and protocol for communicating among the components of SOC 105. For example, communication fabric 180 may enable processors of processor circuitry 160 to issue memory requests to memory system 120 to access and/or store data. In some embodiments, communication fabric 180 is bus-based, including shared bus configurations, cross bar configurations, and hierarchical buses with bridges. In some embodiments, however, communication fabric 180 is packet-based and may be hierarchical with bridges, cross bar, point-to-point, or other interconnects.

Figure 2:
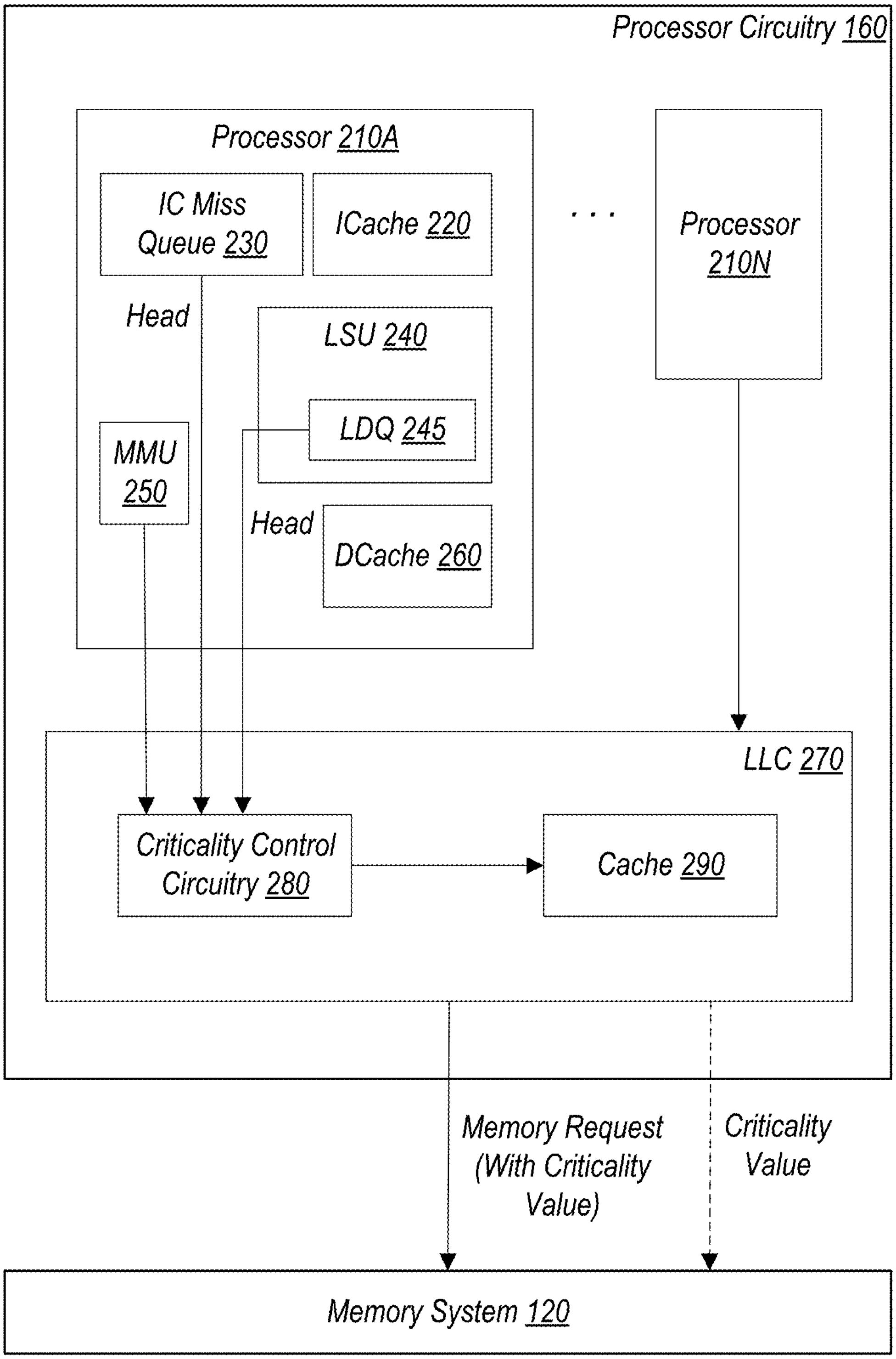
FIG. 2 is a block diagram illustrating one embodiment of processor circuitry configured to assign a criticality value to a memory request.

Turning now to FIG. 2, a block diagram of one embodiment of processor circuitry 160 that is configured to assign a criticality value to a memory request is shown. In the illustrated embodiment, there is memory system 120 and processor circuitry 160. As shown, processor circuitry 160 includes processors 210A-N and a last level cache (LLC) 270. As further shown, processor 210A includes an instruction cache (ICache) 220, an instruction cache (IC) miss queue 230, a load/store unit (LSU) 240 with a load queue (LDQ) 245, a memory management unit (MMU) 250, and a data cache (DCache) 260. Also as shown, LLC 270 includes criticality control circuitry 280 and a cache 290. The illustrated embodiment may be implemented differently than shown. For example, processor circuitry 160 may include one or more coprocessors in addition to processors 210A-N. Processor 210A is illustrated in greater detail, and other processors such as processor 210N may be similar.

A processor 210, in various embodiments, includes any circuitry and/or microcode that is configured to execute instructions defined in an instruction set architecture implemented by that processor 210. Processors 210A-N may encompass discrete microprocessors, processors implemented as multiple integrated circuits, processors and/or microprocessors integrated into multichip module implementations, etc. Processors 210A-N can fetch data from memory 110 (not shown) as a part of executing load instructions and store the fetched data in caches within processor circuitry 160. As shown, processors 210A-N share LLC 270 while processor 210A (for example) includes its own caches (e.g., DCache 260) for storing data. Processors 210A-N can retrieve instructions (e.g., from the caches) and execute the instructions (e.g., conditional branch instructions, ALU instructions, etc.) to perform various operations and write a result of the operations back to memory 110 via memory system 120.

ICache 220, in various embodiments, is circuitry that is configured to store instructions that are fetched by processor 210A for execution. ICache 220 (also, DCache 260 and cache 290) may be a cache having any desired capacity, cache line size, and configuration. A cache line, in various embodiments, is allocated/deallocated in a cache as a unit and defines the unit of allocation/deallocation for the cache. Cache lines may vary in size (e.g., 32 bytes, 64 bytes, or larger or smaller). Different caches may have different cache line sizes. There may further be more additional levels of cache between ICache 220/DCache 260 and memory 110, such as LLC 270. Processor 210A may include fetch and decode circuitry (not shown) configured to fetch instructions from LLC 270 or memory 110 and store them in ICache 220. The fetch and decode circuitry may issue instructions from ICache 220 to decoder circuitry for decoding and converting into operation(s) and/or micro-operation(s) for execution by execution circuitry of processor 210A. If a fetch misses in ICache 220, the fetch for the cache line of instructions may be queued in IC miss queue 230. IC miss queue 230, in various embodiments, is circuitry that is configured to store missed fetches and issue them to LLC 270 as fill requests for ICache 220.

LSU 240, in various embodiments, is circuitry that is configured to execute memory operations ("ops"). Generally, a memory op is an instruction op that specifies an access to memory 110, although that memory access may be completed in a cache, such as DCache 260. A load memory op may specify a transfer of data from a memory location to a register located in processor 210A, while a store memory op may specify a transfer of data from a register to a memory location. Load memory ops can be referred to as load ops or loads, and store memory ops can be referred to as store ops or stores. The loads may attempt to read data from DCache 260 and, in the case that a load misses in DCache 260, may be transmitted to LLC 270 as a fill request for DCache 260. Loads transmitted to LLC 270 may remain in the LDQ 245 awaiting data. LDQ 245, in various embodiments, is circuitry configured to track loads from initial execution to retirement by LSU 240. LDQ 245 may be responsible for ensuring the memory ordering rules are not violated (between out of order executed loads, as well as between loads and stores).

MMU 250, in various embodiments, is circuitry that is configured to provide address translations (e.g., virtual to physical) for instruction fetch addresses and load/store addresses. MMU 250 may include one or more translation lookaside buffers (TLBs), as well as table walk circuitry to perform the translation table reads to obtain a translation for an address that misses in the TLBs. MMU 250 may transmit the table walk reads to LLC 270. In some embodiments, MMU 250 may access DCache 260 for a potential cache hit on the table walk reads prior to transmitting to LLC 270, and may not transmit the reads to LLC 270 if they hit in DCache 260. In other embodiments, page table data is not cached in DCache 260 and thus MMU 250 may transmit table walk reads to LLC 270. DCache 260, in various embodiments, is circuitry that is configured to cache data fetched or generated by processor 210A.

LLC 270, in various embodiments, is the highest level cache circuitry within processor circuitry 160 and is shared between processors 210A-N. LLC 270 includes cache 290, which may have any capacity and configuration. Memory requests from processors 210A-N may be checked for a hit in cache 290 and data may be returned as a fill to ICache 220, DCache 260, or MMU 250 in the event of a hit. If the memory request is a miss in cache 290, LLC 270 may transmit a memory request to memory system 120 and may return the fill to the appropriate processor 210 in response to memory system 120 returning a fill to LLC 270. LLC 270 may also fill the data into cache 290 in the event of a miss.

At the time of issuing a memory request to memory system 120, LLC 270 may assign a criticality value to the memory request. In various embodiments, criticality control circuitry 280 is configured to determine the criticality value based on certain criteria and then assign the value to the memory request (e.g., include it in the memory request or pass it separately from the memory request to memory system 120 as depicted in FIG. 2 by the dashed line from LLC 270 to memory system 120). For example, criticality control circuitry 280 may set one or more bits in the memory request to indicate its criticality. The criticality value may indicate a non-critical status or a critical status.

Criticality control circuitry 280 may consider various factors in assigning the criticality values to memory requests. In various embodiments, criticality control circuitry 280 assigns a critical status value to memory requests that correspond to transactions of MMU 250. More particularly, fills that are for table walk requests may be categorized as critical. A TLB miss is likely to affect additional instruction fetches or load/store requests, since a translation covers a fairly large amount of data and code sequences tend to access data that is near other recently accessed data. A page may be 4 kilobytes in size, 16 kilobytes in size, or even larger such as 1 Megabyte or 2 Megabytes. In various embodiments, criticality control circuitry 280 assigns a critical status value to a memory request corresponding to a load at the head of LDQ 245; that load may be the oldest load outstanding in processor 210A. Thus, it is likely that the load is stalling the retirement of other completed instructions or there are a number of instructions stalled due to dependency on the load data (either direct or indirect). Fill requests for loads that are at the head of LDQ 245 may thus be assigned critical status. Similarly, if an instruction fetch request is the oldest fetch request in IC miss queue 230 (it is at the head of IC miss queue 230), then instruction fetching is likely to be stalled awaiting the instructions. Such instruction fetches may be assigned critical status. Other embodiments may include additional factors in a given processor 210A-N, or subsets of the above factors and other factors, as desired.

It is noted that various instructions, memory requests, etc. are referred to as younger or older than other instructions, requests etc. A given operation is younger than another operation if the given operation is derived from an instruction that is after the instruction from which the other operation is derived in program order. Similarly, a given operation is older than another operation if the given operation is derived from an instruction that is before the instruction from which the other operation is derived in program order.

Also, at the time of a fill to processors 210A-N, LLC 270 may assign a criticality value for the cache line of the fill. Criticality control circuitry 280 may determine the criticality value and may update cache 290 with the criticality value. For example, the cache tags in cache 290 may include a field for the criticality value. In various embodiments, the criticality values that are assigned to cache lines may be maintained while the cache lines remain valid in the cache hierarchy. These criticality values may affect eviction policies used by one or more caches in the cache hierarchy to evict cache lines.

Furthermore, instead of LLC 270 providing a memory request with a criticality value, in some embodiments, LLC 270 may provide the memory request to memory system 120 and, upon receiving the memory request, memory system 120 sends a criticality request to LLC 270 (or another component of processor circuitry 160) to provide the criticality value. Accordingly, LLC 270 may provide the corresponding criticality value to memory system 120 after memory system 120 has received the memory request.

Figure 3:
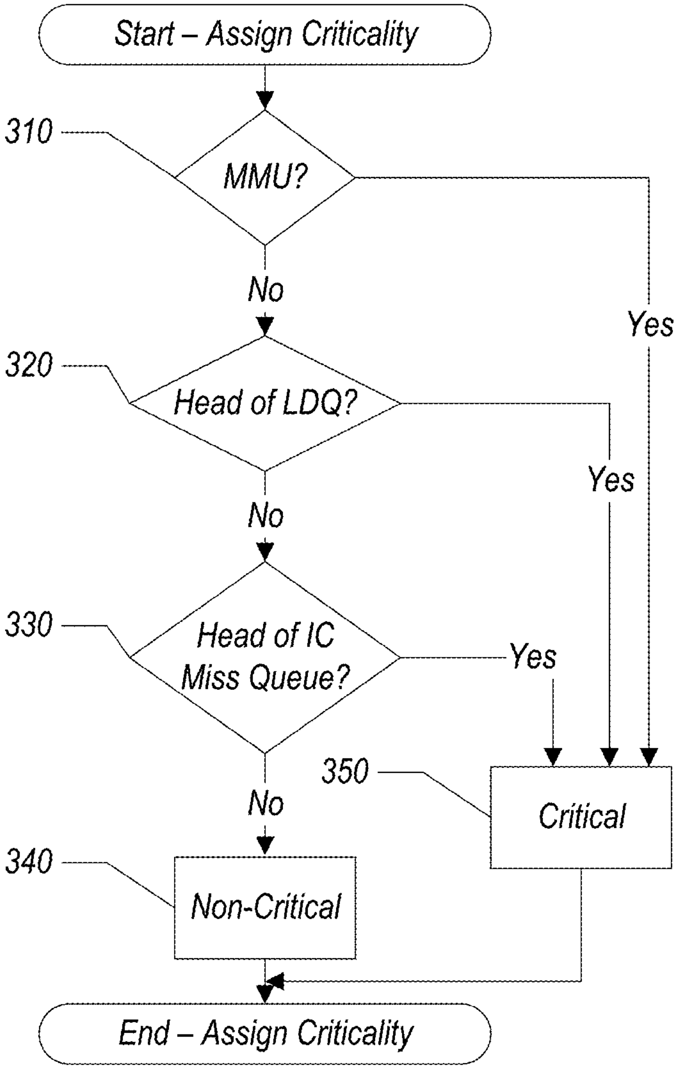
FIG. 3 is a flow diagram illustrating one embodiment of criticality determination.

Turning now to FIG. 3, a flow diagram illustrating one embodiment of a criticality flow to determine whether to assign a critical status to a memory request is shown. While the blocks are shown in a particular order for ease of understanding, other orders may be used. Blocks may be performed in parallel in combinatorial logic in criticality control circuitry 280. Blocks, combinations of blocks, and/or the flowchart as a whole may be pipelined over multiple clock cycles. Criticality control circuitry 280 may be configured to implement the operation shown in FIG. 3.

If a memory request is an MMU tablewalk request (decision block 310, "yes" leg), then criticality control circuitry 280 assigns critical status as the criticality value for the memory request (block 350). If the memory request is for a load operation that is at the head of LDQ 245 (decision block 320, "yes" leg), then criticality control circuitry 280 assigns critical status as the criticality value for the memory request (block 350). And if the memory request is for an instruction cache miss that is at the head of IC miss queue 230 (decision block 330, "yes" leg), then criticality control circuitry 280 assigns critical status as the criticality value for the memory request (block 350). But if none of the above criteria apply (decision blocks 310, 320, and 330, "no" legs), criticality control circuitry 280 assigns non-critical status as the criticality value for the memory request (block 340).

Figure 4:
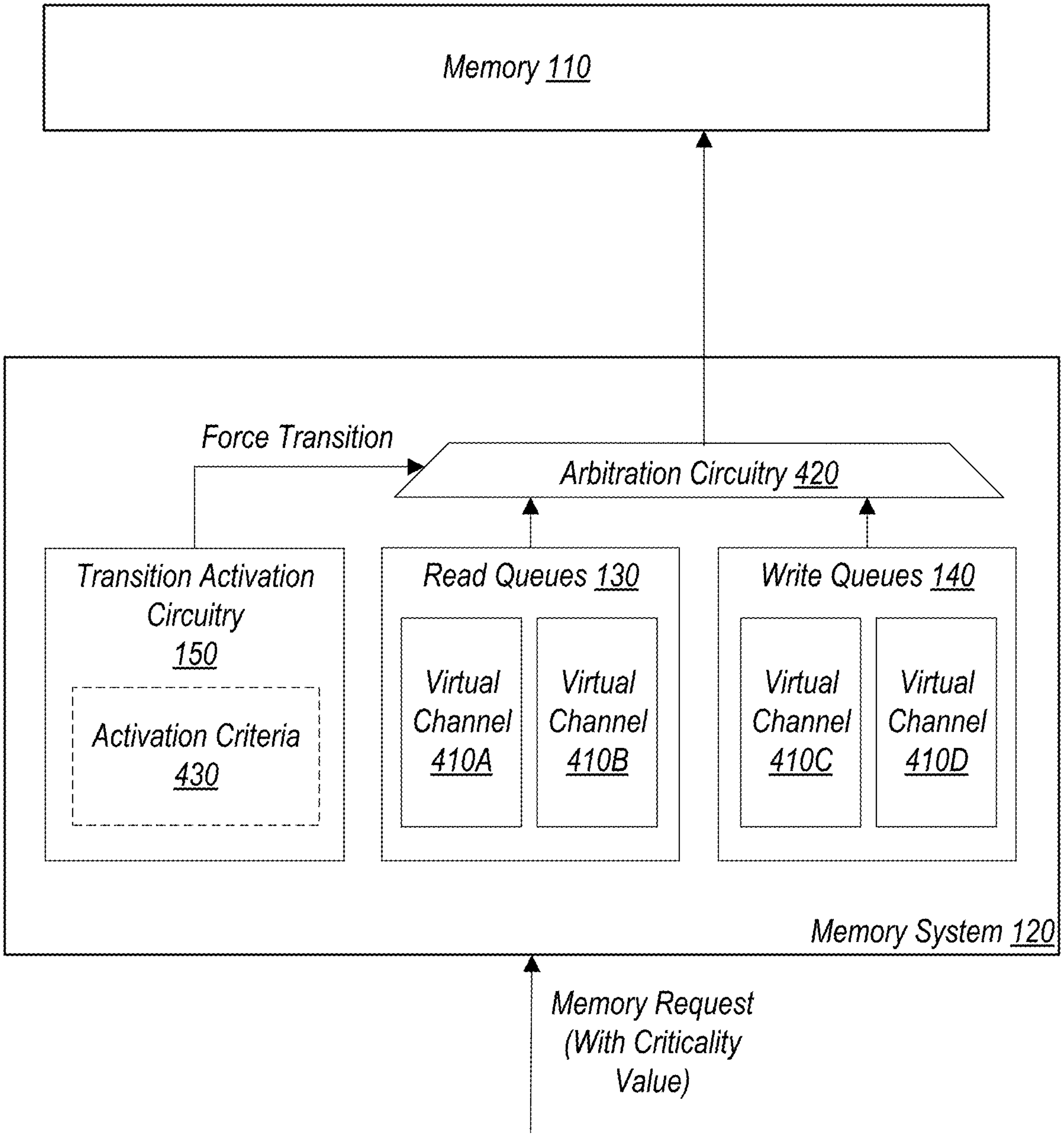
FIG. 4 is a block diagram illustrating one embodiment of a memory system configured to force a transition from a first type of turn to a second type of turn.

Turning now to FIG. 4, a block diagram of one embodiment of memory system 120 that is configured to force a transition from a first type of turn to a second type of turn is shown. In the illustrated embodiment, there is memory 110 and memory system 120. As shown, memory system 120 includes read queues 130, write queues 140, transition activation circuitry 150, and arbitration circuitry 420. As further shown, read queues 130 facilitate virtual channels 410A and 410B, write queues 140 facilitate virtual channels 410C and 410D, and transition activation circuitry assesses activation criteria 430. Memory system 120 may be implemented differently than shown. As an example, memory system 120 may not implement virtual channels 410 and may include a single read queue 130 and/or write queue 140.

In various embodiments, memory requests (or more broadly, transactions involving the memory requests) are associated with different latency and/or bandwidth requirements. These memory requests may be classified into different quality-of-service classes. These classes may include real-time, low-latency, and best-effort (referred to as "bulk")—there may be additional classes. Generally, real-time traffic covers traffic streams that require guaranteed bandwidth over defined windows of time with bounded latency. Failure to satisfy these requirements may lead to user-visible error conditions such as display underrun or frame loss. Components that issue real-time memory requests may include graphics processors. Low-latency traffic covers relatively low bandwidth traffic streams with high sensitivity to latency. A processor 210 may be example of a component that sends low-latency traffic. Low-latency traffic might have the highest priority while real-time traffic is achieving its requested bandwidth, but otherwise real-time traffic may have a higher priority than low-latency traffic. Bulk traffic covers all traffic streams that do not fall into the other classes and may be the lowest priority traffic. An agent (e.g., a processor 210) may send memory requests corresponding to these different classes and the memory requests may be sent via different virtual channels 410. It is noted that additional or other types of traffic may be implemented and different agents may be classified as having different types of traffic.

In various embodiments, memory system 120 supports multiple virtual channels 410 for separating traffic belonging to different classes as defined by their corresponding latency and bandwidth requirements. Virtual channels 410A-D, in various embodiments, are channels associated with the classes above. As an example, virtual channel 410A may be used for real-time read traffic, virtual channel 410B may be used for low-latency read traffic, virtual channel 410C may be used for real-time write traffic, and virtual channel 410D may be used for low-latency write traffic. In various embodiments, memory system 120 employs resources that are dedicated to each virtual channel 410 (e.g., buffers, queues, or linked lists in a queue) so that memory requests on the virtual channels 410 remain logically independent. For example, read queues 130 may include a first set of read queues for virtual channel 410A and a second set of read queues for virtual channel 410B; write queues 140 may include a first set of write queues for virtual channel 410C and a second set of write queues for virtual channel 410D. Thus, when a memory request is received at memory system 120, it may be stored in the appropriate queue corresponding to its virtual channel 410.

Arbitration circuitry 420, in various embodiments, is configured to arbitrate between memory requests to select memory request(s) that are allowed to access or otherwise be issued to memory 110 during an arbitration cycle. In some cases, arbitration circuitry 420 may select one memory request during an arbitration cycle; in other cases, arbitration circuitry 420 may select multiple memory requests that may each be allowed to access a respective memory bank of memory 110. During a read turn, arbitration circuitry 420 may arbitrate between memory requests stored in read queues 130 (particularly, virtual channels 410A and 410B), and during a write turn, arbitration circuitry 420 may arbitrate between memory requests stored in write queues 140 (particularly, virtual channels 410C and 410D).

In general, arbitration circuitry 420 may attempt to balance between various competing goals when selecting among memory requests. That is, arbitration circuitry 420 may attempt to fairly distribute the available bandwidth among virtual channels 410 while also respecting quality of service (QoS) guarantees on certain virtual channels 410, priorities between virtual channels 410, etc. In some embodiments, arbitration circuitry 420 implements a least recently granted (LRG) arbitration scheme, particularly among virtual channels 410 that have the same QoS and/or priority. In some embodiments, arbitration circuitry 420 implements an arbitration scheme based on weights and counters. In particular, virtual channels 410 of a particular group (e.g., virtual channels 410 storing read memory requests) may be associated with weight values and counter values, which may be initialized to a default value (e.g., zero). Arbitration circuitry 420 may select the virtual channel 410 with the smallest counter value as the winner and issue a memory request from that virtual channel 410. Arbitration circuitry 420 may then increment the counter value by the weight value assigned to that virtual channel 410. If multiple virtual channel 410 have the same counter value, then arbitration circuitry 420 may select the virtual channel 410 with the greatest weight value as the winner. Arbitration circuitry 420 may reset the counter values to the default value after one or more conditions are met (e.g., a saturation value is reached).

In some embodiments, memory system 120 also implements a credit system to allow a certain number of requests per virtual channel 410 for a given read or write turn, e.g., based on requested or allocated bandwidth for the different virtual channels 410. This credit system may affect which virtual channels 410 are actually permitted to send requests to arbitration circuitry 420 during a given turn. Further, in some embodiments, arbitration circuitry 420 may override the implemented arbitration scheme under certain conditions. For example, arbitration circuitry 420 may select one or more memory requests from a virtual channel 410 that is in an escalated state (discussed further below), regardless of the priority of other virtual channels 410. In some embodiments, memory requests granted based on overrides consume slots for a virtual channel 410 (where slots may be allocated to a virtual channel 410 for a read or write turn) but do not cause updates to the priority (e.g., the counter value is not incremented) for the granted virtual channel 410.

As used herein, a "slot" refers to a time interval in which memory 110 is to be accessed, and slots may be assigned in different numbers to different virtual channels 410 within a read or write turn. For example, a slot may correspond to the amount of time needed to read or write 64 bytes of data as the result of a column address strobe (CAS). In some embodiments, the number of slots per turn for each virtual channel 410 may be determined based on various criteria (e.g., the bandwidth requirement of a virtual channel 410) while the actual memory requests serviced in different slots may be determined by arbitration circuitry 420. That is, a virtual channel 410 receiving N slots for a write turn may be guaranteed N memory accesses during the turn (absent an forced end to the turn), but does not indicate when in the turn the accesses will occur (rather, arbitration circuitry 420 may determine which requests to grant in each slot.

As shown, memory system 120 receives a memory request with a criticality value. As discussed, criticality control circuitry 280 may set the criticality value at request time based on various criteria. For example, criticality control circuitry 280 may assign a critical status value based on a detection that the memory request is a read request corresponding to an oldest load instruction represented in a queue of processor circuitry 160. In some embodiments, memory system 120 asks processor circuitry 160 for the criticality value upon receiving the request.

In response to memory system 120 receiving the memory request with the criticality value, in various embodiments, transition activation circuitry 150 detects whether the criticality value indicates the memory request as non-critical or critical. If that memory request is not critical, then transition activation circuitry 150 may not force a transition from the current turn (e.g., a write turn) to the next turn (e.g., a read turn). Instead, the current turn may complete (the number of allocated slots for that turn may be consumed). But if that memory request is critical, then transition activation circuitry 150 may force a transition from the current turn to the next turn without completing the current turn (that is, without consuming all slots allocated to the current turn). In some embodiments, transition activation circuitry 150 always forces a transition from the current turn to the next turn upon a critical memory request being received. But always forcing a turn may result in a performance degradation for certain virtual channels or memory request types. Thus, in various embodiments, upon a critical memory request being received, transition activation circuitry 150 forces a transition from the current turn to the next turn if activation criteria 430 are met.

Activation criteria 430, in various embodiments, comprise one or more criteria used by transition activation circuitry 150 to determine if a forced transition is permitted. If activation criteria 430 are met, then transition activation circuitry 150 may force the transition from the current turn to the next turn. But, in various embodiments, if at least one criterion of activation criteria 430 is not met, then transition activation circuitry 150 does not force the transition and the current turn is allowed to complete. If at least one criterion of activation criteria 430 is not met when transition activation circuitry 150 makes it determination and subsequently all of the criteria of activation criteria 430 are met, transition activation circuitry 150 may still not force the transition for the critical memory request, although transition activation circuitry 150 may force the transition if another critical memory request is received at memory system 120 when activation criteria 430 are met. But in some embodiments, transition activation circuitry 150 may force the transition if all of the criteria of activation criteria 430 are subsequently met after transition activation circuitry 150's initial determination that at least one criterion of activation criteria 430 is not met. It is also noted that, in some embodiments, activation criteria 430 may be implemented such that if at least one criterion of activation criteria 430 is met, transition activation circuitry 150 does not force the transition.

In various embodiments, activation criteria 430 are assessed only when determining if a forced transition from a write turn to a read turn is permitted. Consequently, if a critical read request is received during a read turn, transition activation circuitry 150 may not determine to force a transition. If the critical read request is received during a write turn, transition activation circuitry 150 may determine whether a forced transition to a read turn is permitted. Transition activation circuitry 150 may not assess activation criteria 430 when a critical write request is received, independent of whether it is received during a read or write turn. In an embodiment, activation criteria 430 are assessed only when determining if a forced transition from a read turn to a write turn is permitted. As such, activation circuitry 150 may assess activation criteria 430 when a critical write request is received but not when a critical read request is received. Examples of activation criteria 430 are discussed with respect to FIG. 5.

As discussed, upon a critical memory request being received by memory system 120, transition activation circuitry 150 may force a transition from a write turn to a read turn based on a determination that activation criteria 430 are met. To force an early transition, transition activation circuitry 150 may instruct arbitration circuitry 420 to begin arbitrating between the memory requests of the next turn (e.g., process read requests if transitioning to a read turn). In various embodiments, if the memory request is a critical read request, then arbitration circuitry 420 prioritizes, during the read turn, the critical read request over other read requests that may be of the same virtual channel 410 and different virtual channels 410. That is, read requests of a given virtual channel 410 may be stored in a queue such that they are processed in the order in which they are received—i.e., a first in, first out order. Arbitration circuitry 420 (or a read queue 130) may prioritize the critical read request by processing it ahead of other read requests that are in front of it according to the order. Also, arbitration circuitry 420 may prioritize the critical read request over read requests of other virtual channels 410—e.g., if a real-time read request should be selected but the critical read request is a low-latency read request, arbitration circuitry 420 may select the critical read request over the real-time read request.

In various embodiments, memory 110 comprises multiple DRAM banks. A given read or write request may be directed at one or more of the banks. Accordingly, arbitration circuitry 420 may prioritize critical read requests over other read requests directed at a particular DRAM bank (i.e., prioritize on a per-bank basis). In some embodiments, arbitration circuitry 420 can prioritize a critical read request over other critical read requests. For example, the oldest critical read request in read queue 130 may be prioritized over the other critical read requests in read queue 130. As another example, in some embodiments, a range of criticality values (e.g., from 0 to 7) may be assigned to read requests instead of a binary criticality level (non-critical versus critical). As such, arbitration circuitry 420 may prioritize a critical read request that is assigned a higher critical value over another critical read request that is assigned a lower critical value. But, in some embodiments, arbitration circuitry 420 does not prioritize the critical read request over read requests. Accordingly, the critical read request may be processed in accordance with its position in its read queue 130.

Figure 5:
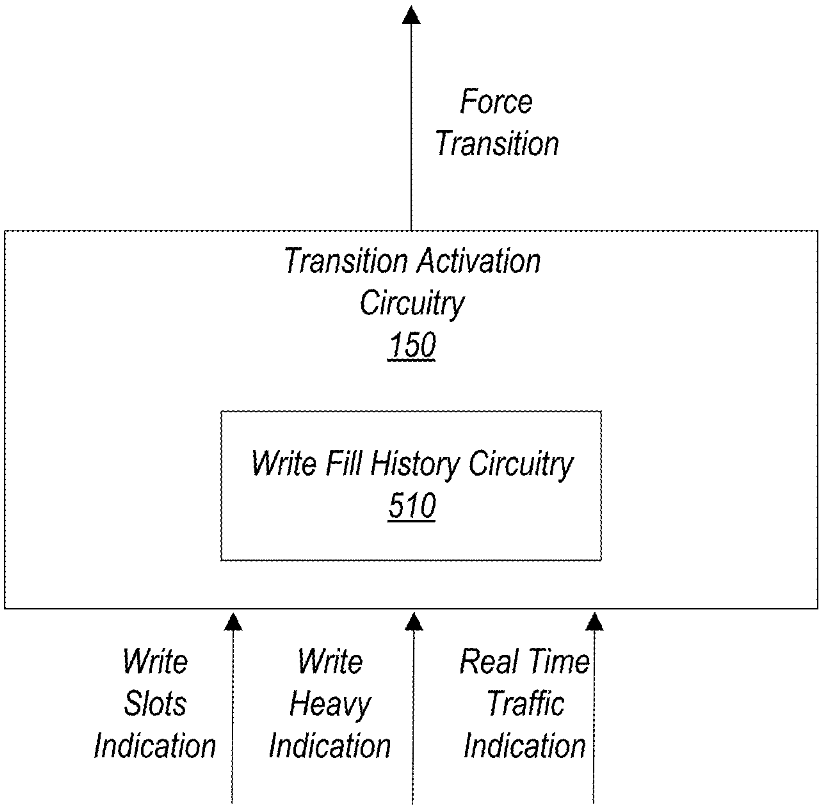
FIG. 5 is a block diagram illustrating one embodiment of transition activation circuitry configured to force or not force a transition based on particular inputs.

Turning now to FIG. 5, a block diagram of one embodiment of transition activation circuitry 150 is shown. As shown in the illustrated embodiment, transition activation circuitry 150 includes write fill history circuitry 510 and receives a write slots indication, a write heavy indication, and a real time traffic indication. The illustrated embodiment may be implemented differently than shown. For example, activation criteria 430 may vary between embodiments, and thus transition activation circuitry 150 may receive more or fewer indications (e.g., write slots indication may not be received in some embodiments).

Generally speaking, it may not be desirable to force a transition from a write turn to a read turn during periods of heavy writes. Accordingly, certain criteria of activation criteria 430 may pertain to ensuring that the forced transition is not occurring during a write heavy period. In various embodiments, transition activation circuitry 150 does not force a transition from the current write turn if a write heavy indication is received or set. The write heavy indication may be received or set because of different conditions occurring. In various embodiments, the write heavy indication is received if a write queue fill level associated with a write queue 140 is greater than (or equal to, in some cases) a "panic" threshold. The write queue fill level being greater than the panic threshold may indicate that the write queue 140 is in danger of becoming full or otherwise causing pushback. Consequently, transition activation circuitry 150 may not force a transition from the current write turn to avoid the write queue 140 becoming full. Thus, activation criteria 430 may include a criterion that a write heavy indication is not received or set, or more specifically, a criterion that a write queue fill level associated with a write queue 140 is less than (or equal to, in some cases) a write heavy threshold.

In various embodiments, the write heavy indication is received if a shared pool of write credits is empty (or close to empty). As discussed, memory system 120 may implement a credit system to allow a certain number of requests per virtual channel 410 for a given read or write turn, e.g., based on requested or allocated bandwidth for the different virtual channels 410. In some embodiments, a pool of credits is allocated and shared between different virtual channels 410 of the same type (e.g., virtual channels 410 having write requests). If the credits allocated to a virtual channel 410 are consumed for write requests, credits from the shared pool of credits may then be used. In some embodiments, credits from the shared pool of credits are consumed first before the credits specifically allocated to a virtual channel 410. If the shared pool is empty (or close to empty), then this may indicate that write queue 140 is running out of resources and that a significant number of write requests may need to be processed during the current write turn in order to avoid write queue 140 filling up in the presence of heavy write traffic. As such, transition activation circuitry 150 may not force a transition from the current write turn. Thus, activation criteria 430 may include a criterion that there is at least a threshold number of credits available in the pool of credits (e.g., more than zero).

In various embodiments, transition activation circuitry 150 does not force a transition from the current write turn if a minimum number of write slots (e.g., two) has not been used in the current write turn. As discussed, a number of slots may be allocated for a turn that represent at least that number of memory requests being processed during the turn. Accordingly, it may be desirable to ensure that at least a certain number of write requests has been processed in the current write turn before forcing a transition to a read turn. This may ensure that at least some progress is made on the write traffic and may help to prevent a write queue 140 from becoming full. Accordingly, transition activation circuitry 150 may not force a transition from the current write turn. Thus, activation criteria 430 may include a criterion that at least a minimum number of write slots (or a minimum number of write requests) has been processed during the current write turn. In some embodiments, the minimum number may dynamically change based on the current fill level of a write queue 140.

In various embodiments, transition activation circuitry 150 does not force a transition from the current write turn when one or more previous write turns have been write heavy. In particular, in various embodiments, write fill history circuitry 510 is configured to track the number of instances of a write fill level of write queue(s) 140 satisfying (e.g., greater than) a fill level threshold when sampled. The write fill level may be sampled one or more times during a write turn. Write fill history circuitry 510 may include a buffer used for storing information about the number of observed instances of the write fill level satisfying the fill level threshold during a turn. If the number of instances satisfies a threshold number, then transition activation circuitry 150 may classify the associated write turn as write heavy. In various embodiments, if transition activation circuitry 150 observes a threshold number of previous write heavy turns to the current write turn (e.g., the last three write turns have been write heavy), then transition activation circuitry 150 does not force a transition from the current write turn. Thus, activation criteria 430 may include a criterion that a threshold number of write turns preceding the current write turn (e.g., the last three write turns) has not been write heavy.

In some embodiments, if the current write turn is considered write heavy based on the sampling performed during the current write turn, then transition activation circuitry 150 does not force a transition from the current write turn. Thus, activation criteria 430 may include a criterion that the current write turn is not write heavy based on the sampling performed during the current write turn. In some embodiments, if the number of observed instances of the write fill level satisfying the fill level threshold is greater than (or equal to, in some cases) a threshold number, then transition activation circuitry 150 does not force a transition from the write turn. This condition may be based on the number of observed instances as opposed to the number of previous write heavy turns. Thus, activation criteria 430 may include a criterion that the number of observed instances does not satisfy a threshold number of instances.

In various embodiments, transition activation circuitry 150 does not force a transition from the current write turn when certain traffic (e.g., real-time traffic) is in an escalated state. In particular, components of system 100 that are issuing real-time memory requests may report a buffer status (e.g., time to overflow or underflow for a buffer) that indicates whether their requested bandwidth is being satisfied. Based on that buffer status, a current latency tolerance value may be maintained, where a higher current latency tolerance (e.g., near the target latency tolerance) may indicate that real-time traffic is receiving the bandwidth that it requires while a low current latency tolerance may indicate that the traffic is at risk (e.g., of buffer overflow or underflow). When the current latency tolerance is less than (or equal to, in some cases) a low threshold value, in various embodiments, real-time traffic becomes escalated. While real-time traffic is escalated, arbitration circuitry 420 may override its normal arbitration scheme in favor an arbitration scheme that favors real-time memory requests (that is, if a low latency memory request should be selected during an arbitration cycle in accordance with the normal arbitration scheme but real-time traffic is escalated, then arbitration circuitry 420 may override the scheme and select a real-time memory request). This may allow real-time components of system 100 to receive the bandwidth needed to catch back up. When there is traffic in an escalated state, then transition activation circuitry 150 may not force a transition from the current write turn. Thus, activation criteria 430 may include a criterion that traffic having a certain prioritization level (e.g., real-time traffic, low-latency traffic, etc.) is not in an escalated state. Activation criteria 430 may further include a criterion that read traffic (or write traffic) having a certain prioritization is not in an escalated state.

Different combinations of the above criteria may be used in different embodiments. For example, in various embodiments, activation criteria 430 include the criterion that a minimum number of write requests has been processed during the current write turn, while in different embodiments, activation criteria 430 do include that criterion. Furthermore, there may be other criteria than the criteria discussed above. As an example, activation criteria 430 may include a criterion that there is at least a threshold number of available entries (e.g., 10) in a set of write queues 140 to store write requests. The criterion may be that there are enough write entries in the set of write queues 140 to support scaled real-time write bandwidth injection—that is, the write request space dedicated to real-time write traffic plus shared write request space is greater than (or equal to, in some cases) a threshold space size. As another example, activation criteria 430 may include a criterion that all low latency traffic early turn conditions are met.

As further examples, in some embodiments, transition activation circuitry 150 does not force a transition until a configurable threshold of accumulated critical read requests is met—one critical read request may not be sufficient to force the transition to a read turn. Moreover, this accumulation threshold may dynamically change—e.g., as the number of pending write requests increases/decreases, the number of critical read requests needed to force the transition may increase/decrease. As mentioned, system 100 may use a range of criticality values (e.g., from 0 to 7). Accordingly, transition activation circuitry 150 may not force a transition until a summation of the criticality values of the critical read requests in read queue 130 reaches a configurable threshold (e.g., 15).

Figure 6:
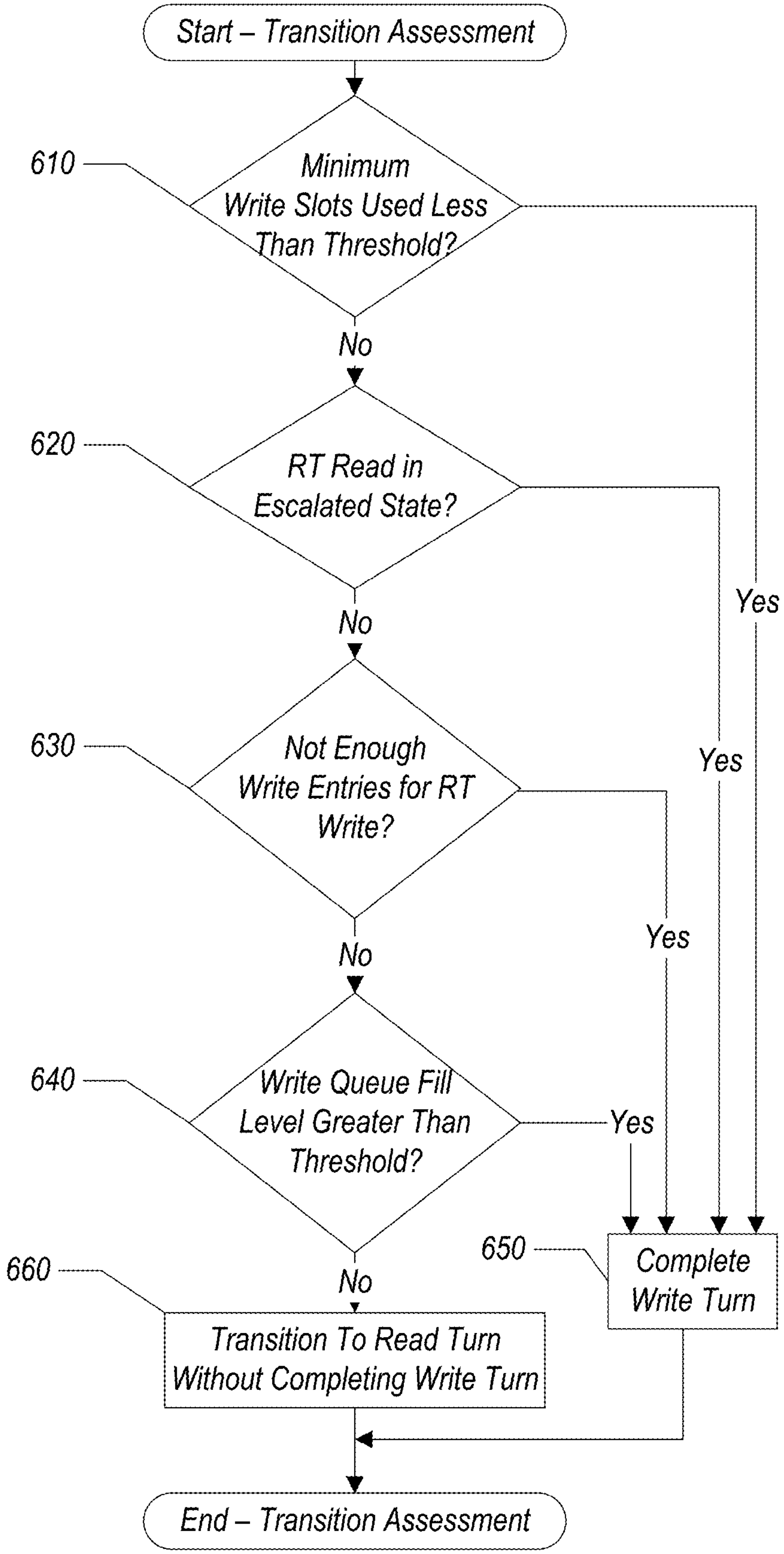
FIG. 6 is a flow diagram illustrating one embodiment of transition assessment.

Turning now to FIG. 6, a flow diagram illustrating one embodiment of a transition flow to determine whether to force a transition from a write turn to a read turn is shown. While the blocks are shown in a particular order for ease of understanding, other orders may be used. Blocks may be performed in parallel in combinatorial logic in transition activation circuitry 150. Blocks, combinations of blocks, and/or the flowchart as a whole may be pipelined over multiple clock cycles. Transition activation circuitry 150 may be configured to implement the operation shown in FIG. 6.

If the minimum number of write slots used in the current write turn is less than a defined threshold (e.g., the minimum number is less than two slots) (decision block 610, "yes" leg), then transition activation circuitry 150 does not force a transition and the current write turn is allowed to complete (block 650). If real-time read traffic is in an escalated state (decision block 620, "yes" leg), then transition activation circuitry 150 does not force a transition and the write turn is allowed to complete (block 650). If there is not enough write entries for real-time write traffic (decision block 630, "yes" leg), then transition activation circuitry 150 does not force a transition and the write turn is allowed to complete (block 650). If the write queue fill level is greater than a threshold (decision block 640, "yes" leg), then transition activation circuitry 150 does not force a transition and the write turn is allowed to complete (block 650). But if none of the above criteria apply (decision blocks 610, 620, 630, and 640, "no" legs), then transition activation circuitry 150 forces a transition to a read turn without completing the current write turn (block 660) to process a critical read request.

Turning now to FIG. 7, a flow diagram of a method 700 is shown. Method 700 is one embodiment of a method performed by a memory system (e.g., memory system 120) to process a read request that is identified as critical. Method 700 may include more or fewer steps than shown. For example, method 700 may include a step in which the memory system processes a critical read request during a read turn.

Method 700 begins in step 710 with the memory system receiving, during a write turn in which a plurality of write requests are processed, a read request and an indication of a criticality of the read request assigned by processor circuitry (e.g., processor circuitry 160). The processor circuitry may include cache circuitry (e.g., LLC 270) configured to assign one of a plurality of criticality values to the read request as an indication of the criticality of the read request. The plurality of criticality values may include a non-critical value and a critical value. In various embodiments, the cache circuitry is configured to assign the critical value to the read request based on a detection that the read request corresponds to an oldest load instruction represented in a load queue (e.g., LDQ 245) of the processor circuitry.

In step 720, based on the indication identifying the read request as a critical read request and a detection that a set of activation criteria is satisfied, the memory system transitions, to process the critical read request, from the write turn to a read turn without completing the write turn. In various embodiments, the memory system is configured to, based on a detection that the set of activation criteria is not satisfied, complete the write turn before transitioning to the read turn to process the critical read request. The memory system may complete the write turn even in the case that the set of activation criteria is subsequently satisfied after the detection that the set of activation criteria is not satisfied. In various embodiments, the memory system includes a set of read queues (e.g., a set of read queues 130) configured to store read requests. The memory system may prioritize the critical read request over other read requests in the set of read queues so that the critical read request is processed before the other read requests.

In various embodiments, the memory system includes a set of write queues (e.g., a set of write queues 140) configured to store write requests. The set of activation criteria may include a criterion that a fill level of the set of write queues is less than a write heavy threshold. The set of activation criteria may include a criterion that there is at least a threshold number of available entries in the set of write queues to store write requests of a particular prioritization level (e.g., real-time write requests). The set of activation criteria may include a criterion that read traffic of a particular prioritization level (e.g., real-time read traffic) is not in an escalated state.

Figure 8:
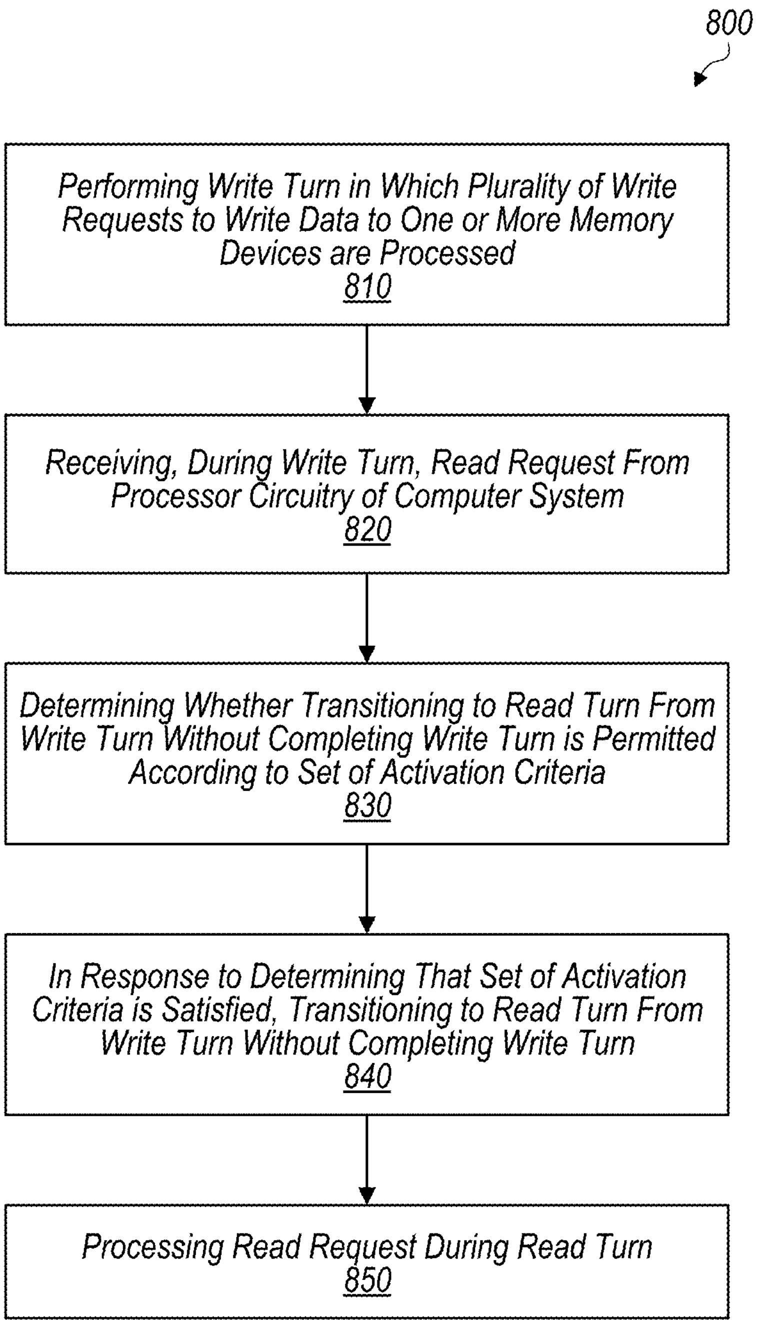

Turning now to FIG. 8, a flow diagram of a method 800 is shown. Method 800 is one embodiment of a method that is performed by a memory system (e.g., memory system 120) of a computer system to process a read request that is identified as critical. Method 800 may include more or fewer steps than shown. For example, method 800 may include a step in which the memory system transitions back to a write turn after completing the read turn.

Method 800 begins in step 810 with the memory system performing a write turn in which a plurality of write requests to write data to one or more memory devices (e.g., memory 110) are processed. In step 820, the memory system receives, during the write turn, a read request from processor circuitry (e.g., processor circuitry 160) of the computer system. In some cases, the read request is identified as critical by the processor circuitry. The processor circuitry may identify the read request as critical based on a detection that the read request corresponds to an oldest instruction in an instruction miss queue (e.g., IC miss queue 230) of the processor circuitry.

In step 830, the memory system determines whether transitioning to a read turn from the write turn without completing the write turn is permitted according to a set of activation criteria. The memory system may include a set of write queues (e.g., a set of write queues 140) configured to store write requests. In various embodiments, the memory system tracks, over a set of previous turns (e.g., five), a number of instances of a fill level of the set of write queues satisfying a write heavy threshold. The set of activation criteria may include a criterion that the number of instances does not satisfy a threshold number of instances. The set of activation criteria may include a criterion that traffic having a particular prioritization level (e.g., real-time traffic) is not in an escalated state. The set of activation criteria may include a criterion that there is at least a threshold number of available entries in a set of write queues of the memory system.

In step 840, in response to determining that the set of activation criteria is satisfied, the memory system transitions to the read turn from the write turn without completing the write turn. In step 850, the memory system processes the read request during the read turn. The read request may be stored in a read queue (e.g., a read queue 130), and the memory system may process, during the read turn, requests from the read queue in the order in which they are stored without prioritizing the read request over other read requests in the read queue.

Figure 9:
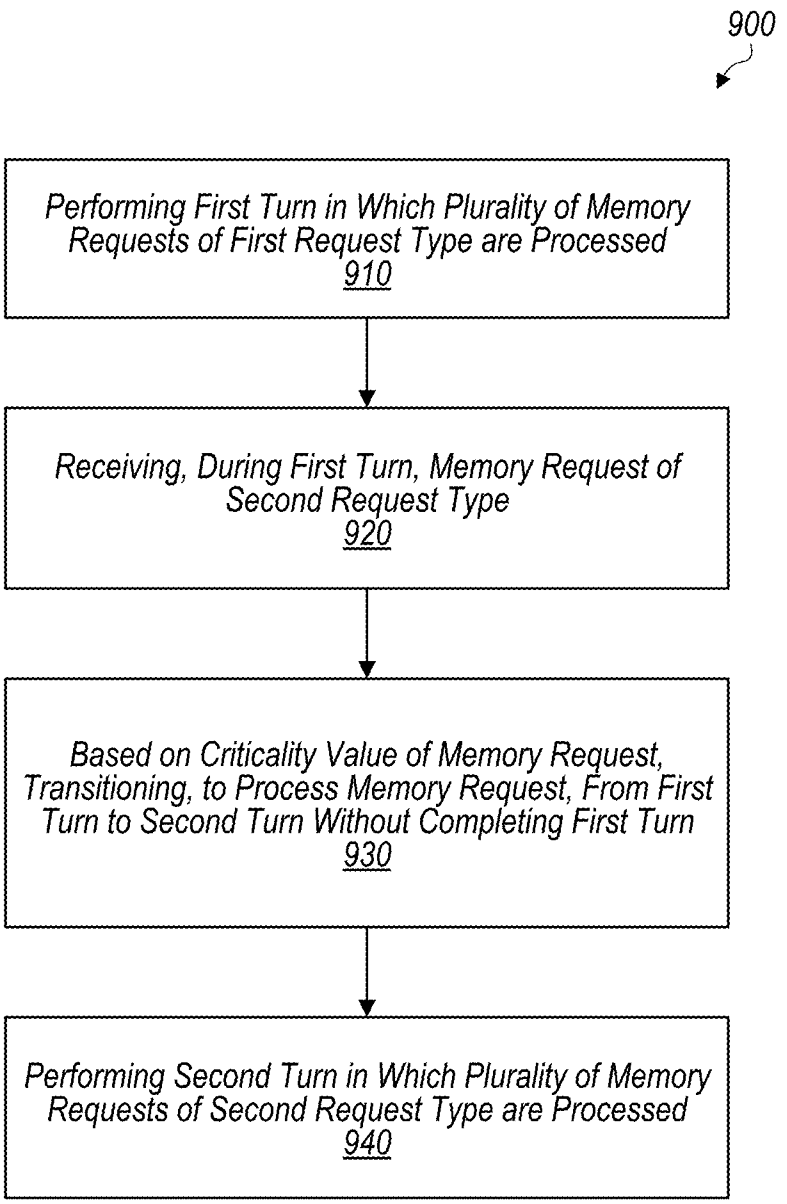

Turning now to FIG. 9, a flow diagram of a method 900 is shown. Method 900 is one embodiment of a method that is performed by a memory system (e.g., memory system 120) to process a memory request that is identified as critical. Method 900 may include more or fewer steps than shown. For example, method 900 may include a step in which the memory system transitions from the second turn back to the first turn to process additional requests of the first request type.

Method 900 begins in step 910 with the memory system performing a first turn in which a plurality of memory requests of a first request type are processed. In some cases, the plurality of memory requests of the first request type may be write requests and the plurality of memory requests of a second request type may be read requests. In some cases, the plurality of memory requests of the first request type may be read requests and the plurality of memory requests of the second request type may be write requests. Accordingly, the first turn may be a write turn or a read turn.

In step 920, the memory system receives, during the first turn, a memory request of a second request type. The memory system may be a part of a system that comprises processor circuitry (e.g., processor circuitry 160) that includes cache circuitry (e.g., LLC 270) configured to issue memory requests and assign one of a plurality of criticality values to a given one of the memory requests. In some embodiments, the memory system is configured to, upon the reception of the memory request, issue a request to the processor circuitry to provide the criticality value of the memory request. The plurality of critical values may include a critical value and at least one non-critical value. In some embodiments, the processor circuitry also includes memory management circuitry (e.g., MMU 250) that is configured to translate virtual memory addresses to physical memory addresses. The cache circuitry may be configured to assign the critical value to the memory request based on a detection that the memory request corresponds to a transaction of the memory management circuitry.

In step 930, based on the criticality value of the memory request, the memory system transitions, to process the memory request, from the first turn to a second turn without completing the first turn. The memory system may include a set of queues configured to store memory requests of the first request type. In various embodiments, the memory system is configured to manage the set of queues based on a pool of credits. As such, the memory system may be configured to transition from the first turn to the second turn without completing the first turn based on the criticality value and a detection that a set of activation criteria is satisfied. The set of activation criteria may include a criterion that there is at least a threshold number of credits available in the pool of credits.

In step 940, the memory system performs the second turn in which a plurality of memory requests of the second request type are processed. The memory system may include a set of queues configured to store memory requests of the second request type. In various embodiments, the memory system is configured to, during the second turn, process the memory requests in the set of queues in order in which the memory requests of the second request type are stored.

Example Device

Figure 10:
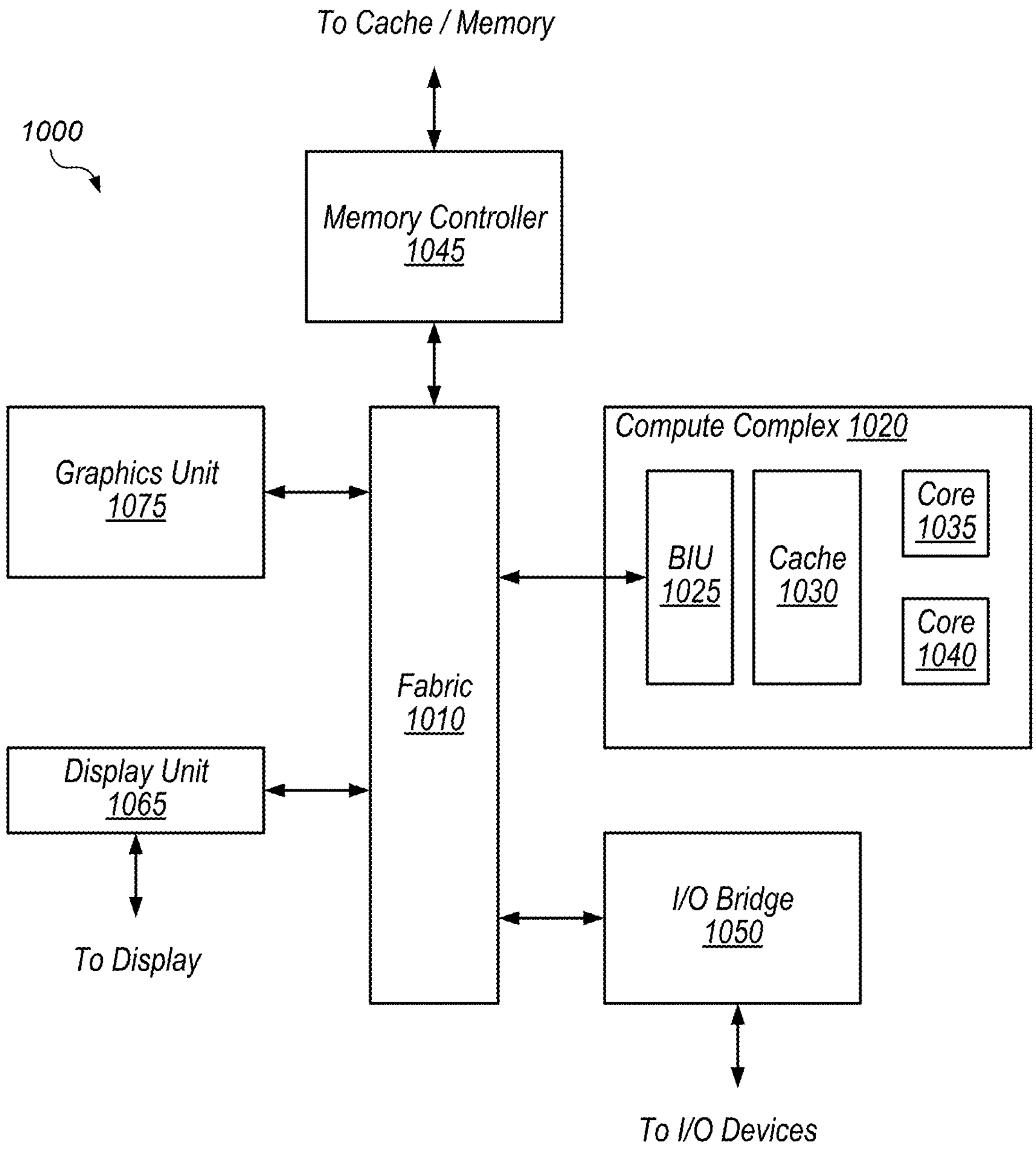
FIG. 10 is a block diagram illustrating one embodiment of a device that includes one or more components described in this disclosure.

Referring now to FIG. 10, a block diagram illustrating an example embodiment of a device 1000 is shown. In some embodiments, elements of device 1000 may be included within a system on a chip. Device 1100 may implement system 100 and therefore device 1100 may implement functionality of components of system 100. For example, memory controller 1045 may correspond to memory system 120, compute complex 1020 and/or graphics unit 1075 may correspond to processor circuitry 160, and fabric 1010 may correspond to communication fabric 180. In some embodiments, device 1000 may be included in a mobile device, which may be battery-powered. Therefore, power consumption by device 1000 may be an important design consideration. In the illustrated embodiment, device 1000 includes fabric 1010, compute complex 1020 input/output (I/O) bridge 1050, cache/memory controller 1045, graphics unit 1075, and display unit 1065. In some embodiments, device 1000 may include other components (not shown) in addition to or in place of the illustrated components, such as video processor encoders and decoders, image processing or recognition elements, computer vision elements, etc.

Fabric 1010 may include various interconnects, buses, MUX's, controllers, etc., and may be configured to facilitate communication between various elements of device 1000. In some embodiments, portions of fabric 1010 may be configured to implement various different communication protocols. In other embodiments, fabric 1010 may implement a single communication protocol and elements coupled to fabric 1010 may convert from the single communication protocol to other communication protocols internally.

In the illustrated embodiment, compute complex 1020 includes bus interface unit (BIU) 1025, cache 1030, and cores 1035 and 1040. In various embodiments, compute complex 1020 may include various numbers of processors, processor cores and caches. For example, compute complex 1020 may include 1, 2, or 4 processor cores, or any other suitable number. In one embodiment, cache 1030 is a set associative L2 cache. In some embodiments, cores 1035 and 1040 may include internal instruction and data caches. In some embodiments, a coherency unit (not shown) in fabric 1010, cache 1030, or elsewhere in device 1000 may be configured to maintain coherency between various caches of device 1000. BIU 1025 may be configured to manage communication between compute complex 1020 and other elements of device 1000. Processor cores such as cores 1035 and 1040 may be configured to execute instructions of a particular instruction set architecture (ISA) which may include operating system instructions and user application instructions. These instructions may be stored in computer readable medium such as a memory coupled to memory controller 1045 discussed below.

As used herein, the term "coupled to" may indicate one or more connections between elements, and a coupling may include intervening elements. For example, in FIG. 10, graphics unit 1075 may be described as "coupled to" a memory through fabric 1010 and cache/memory controller 1045. In contrast, in the illustrated embodiment of FIG. 10, graphics unit 1075 is "directly coupled" to fabric 1010 because there are no intervening elements.

Cache/memory controller 1045 may be configured to manage transfer of data between fabric 1010 and one or more caches and memories. For example, cache/memory controller 1045 may be coupled to an L3 cache, which may in turn be coupled to a system memory. In other embodiments, cache/memory controller 1045 may be directly coupled to a memory. In some embodiments, cache/memory controller 1045 may include one or more internal caches. Memory coupled to controller 1045 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1045 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1020 to cause the computing device to perform functionality described herein.

Graphics unit 1075 may include one or more processors, e.g., one or more graphics processing units (GPUs). Graphics unit 1075 may receive graphics-oriented instructions, such as OPENGL®, Metal®, or DIRECT3D® instructions, for example. Graphics unit 1075 may execute specialized GPU instructions or perform other operations based on the received graphics-oriented instructions. Graphics unit 1075 may generally be configured to process large blocks of data in parallel and may build images in a frame buffer for output to a display, which may be included in the device or may be a separate device. Graphics unit 1075 may include transform, lighting, triangle, and rendering engines in one or more graphics processing pipelines. Graphics unit 1075 may output pixel information for display images. Graphics unit 1075, in various embodiments, may include programmable shader circuitry which may include highly parallel execution cores configured to execute graphics programs, which may include pixel tasks, vertex tasks, and compute tasks (which may or may not be graphics-related).

Display unit 1065 may be configured to read data from a frame buffer and provide a stream of pixel values for display. Display unit 1065 may be configured as a display pipeline in some embodiments. Additionally, display unit 1065 may be configured to blend multiple frames to produce an output frame. Further, display unit 1065 may include one or more interfaces (e.g., MIPI® or embedded display port (eDP)) for coupling to a user display (e.g., a touchscreen or an external display).

I/O bridge 1050 may include various elements configured to implement: universal serial bus (USB) communications, security, audio, and low-power always-on functionality, for example. I/O bridge 1050 may also include interfaces such as pulse-width modulation (PWM), general-purpose input/output (GPIO), serial peripheral interface (SPI), and inter-integrated circuit (I2C), for example. Various types of peripherals and devices may be coupled to device 1000 via I/O bridge 1050.

In some embodiments, device 1000 includes network interface circuitry (not explicitly shown), which may be connected to fabric 1010 or I/O bridge 1050. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1000 with connectivity to various types of other devices and networks.

Example Applications

Figure 11:
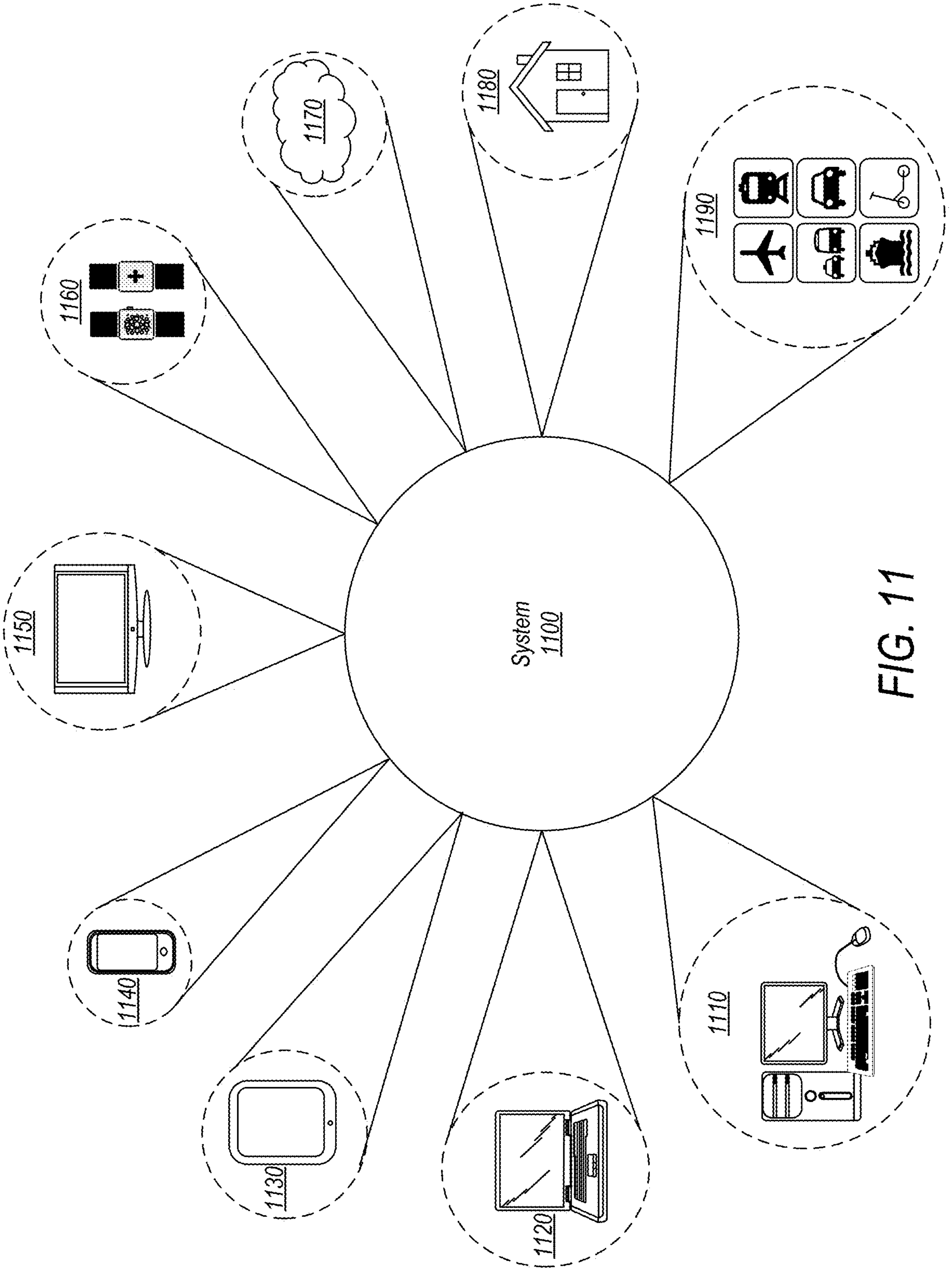
FIG. 11 is a block diagram illustrating one embodiment of a system (that includes one or more components described in this disclosure) used in various types of applications.

Turning now to FIG. 11, various types of systems that may include any of the circuits, devices, or system discussed above. System or device 1100, which may incorporate or otherwise utilize one or more of the techniques described herein, may be utilized in a wide range of areas. For example, system or device 1100 may be utilized as part of the hardware of systems such as a desktop computer 1110, laptop computer 1120, tablet computer 1130, cellular or mobile phone 1140, or television 1150 (or set-top box coupled to a television). In various embodiments, system or device 1100 corresponds to system 100.

Similarly, disclosed elements may be utilized in a wearable device 1160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1100 may also be used in various other contexts. For example, system or device 1100 may be utilized in the context of a server computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices is often referred to as the "Internet of Things" (IoT). Elements may also be implemented in various modes of transportation. For example, system or device 1100 could be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 12:
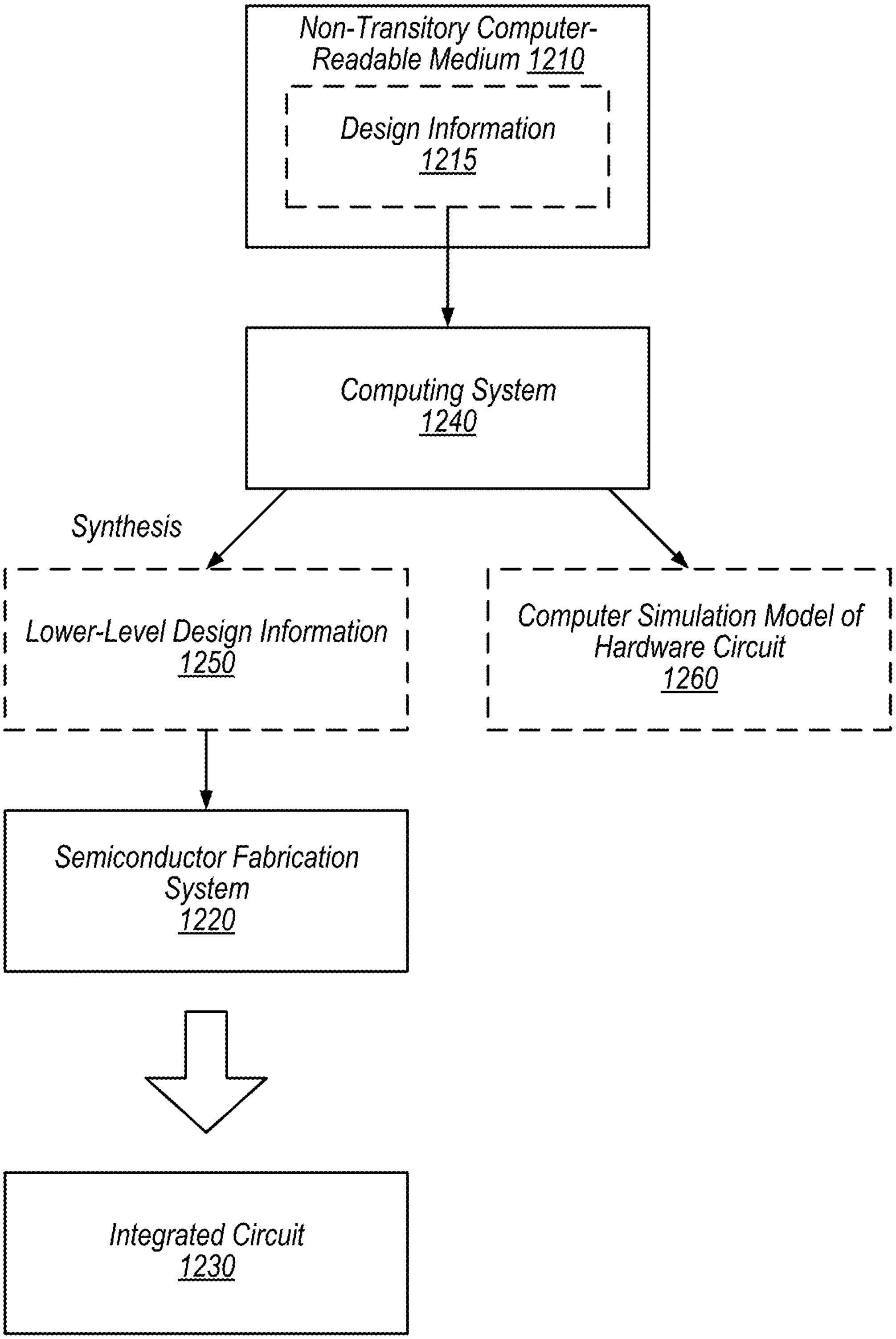
FIG. 12 is a block diagram illustrating one embodiment of a process of fabricating an integrated circuit that includes one or more components described in this disclosure.

FIG. 12 is a block diagram illustrating an example non-transitory computer-readable storage medium that stores circuit design information, according to some embodiments. In the illustrated embodiment, computing system 1240 is configured to process the design information. This may include executing instructions included in the design information, interpreting instructions included in the design information, compiling, transforming, or otherwise updating the design information, etc. Therefore, the design information controls computing system 1240 (e.g., by programming computing system 1240) to perform various operations discussed below, in some embodiments.

In the illustrated example, computing system 1240 processes the design information to generate both a computer simulation model of a hardware circuit 1260 and lower-level design information 1250. In other embodiments, computing system 1240 may generate only one of these outputs, may generate other outputs based on the design information, or both. Regarding the computing simulation, computing system 1240 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1240 also processes the design information to generate lower-level design information 1250 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1250 (potentially among other inputs), semiconductor fabrication system 1220 is configured to fabricate an integrated circuit 1230 (which may correspond to functionality of the simulation model 1260). Note that computing system 1240 may generate different simulation models based on design information at various levels of description, including information 1250, 1215, and so on. The data representing design information 1250 and model 1260 may be stored on medium 1210 or on one or more other media.

In some embodiments, the lower-level design information 1250 controls (e.g., programs) the semiconductor fabrication system 1220 to fabricate the integrated circuit 1230. Thus, when processed by the fabrication system, the design information may program the fabrication system to fabricate a circuit that includes various circuitry disclosed herein.

Non-transitory computer-readable storage medium 1210, may comprise any of various appropriate types of memory devices or storage devices. Non-transitory computer-readable storage medium 1210 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Accordingly, non-transitory computer-readable storage medium 1210 may include two or more memory media; such media may reside in different locations—for example, in different computer systems that are connected over a network.

Design information 1215 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1240, semiconductor fabrication system 1220, or both. In some embodiments, design information may also include one or more cell libraries that specify the synthesis, layout, or both of integrated circuit 1230. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1230 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 and model 1260 are configured to operate according to a circuit design specified by design information 1215, which may include performing any of the functionality described herein. For example, integrated circuit 1230 may include any of various elements shown in FIGS. 1, 2, 4, and 5. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1220 to fabricate integrated circuit 1230.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:

a memory system configured to couple to one or more memory devices, wherein the memory system includes a set of write queues configured to store write requests;

processor circuitry configured to issue read and write requests to the memory system; and wherein the memory system is configured to:

receive, during a write turn in which a plurality of write requests are processed, a read request and an indication of a criticality of the read request assigned by the processor circuitry; and based on the indication identifying that the read request is a critical read request and a detection that a set of activation criteria is satisfied, transition, to process the critical read request, from the write turn to a read turn without completing the write turn, wherein the set of activation criteria includes a criterion that there is at least a threshold number of available entries in the set of write queues to store write requests having a first particular prioritization level.

2. The apparatus of claim 1, wherein the set of activation criteria includes a criterion that a fill level of the set of write queues is less than a write heavy threshold.

3. The apparatus of claim 1, wherein the set of activation criteria includes a criterion that read traffic having a second particular prioritization level is not in an escalated state.

4. The apparatus of claim 1, wherein the memory system is configured to, based on a detection that the set of activation criteria is not satisfied, complete the write turn before transitioning to the read turn to process the critical read request.

5. The apparatus of claim 4, wherein the memory system is configured to complete the write turn even in the case that the set of activation criteria is subsequently satisfied after the detection that the set of activation criteria is not satisfied.

6. The apparatus of claim 1, wherein the memory system includes a set of read queues configured to store read requests, and wherein the memory system is configured to prioritize the critical read request over other read requests in the set of read queues so that the critical read request is processed before the other read requests.

7. The apparatus of claim 1, wherein the processor circuitry includes cache circuitry configured to assign one of a plurality of criticality values to the read request as the indication of the criticality of the read request, wherein the plurality of criticality values includes a non-critical value and a critical value.

8. The apparatus of claim 7, wherein the cache circuitry is configured to assign the critical value to the read request based on a detection that the read request corresponds to an oldest load instruction represented in a load queue of the processor circuitry.

9. A method, comprising:

performing, by a memory system of a computer system, a write turn in which a plurality of write requests to write data to one or more memory devices are processed, wherein the memory system includes a set of write queues configured to store write requests;

receiving, by the memory system during the write turn, a read request from processor circuitry of the computer system, wherein the read request is identified as critical by the processor circuitry;

tracking, by the memory system over a set of previous turns, a number of instances of a fill level of the set of write queues satisfying a write heavy threshold;

determining, by the memory system, whether transitioning to a read turn from the write turn without completing the write turn is permitted according to a set of activation criteria, wherein the set of activation criteria includes a criterion that the number of instances does not satisfy a threshold number of instances;

in response to determining that the set of activation criteria is satisfied, the memory system transitioning to the read turn from the write turn without completing the write turn; and processing, by the memory system, the read request during the read turn.

10. The method of claim 9, wherein the set of activation criteria includes a criterion that traffic having a particular prioritization level is not in an escalated state.

11. The method of claim 9, wherein the set of activation criteria includes a criterion that there is at least a threshold number of available entries in the set of write queues of the memory system.

12. The method of claim 9, further comprising:

identifying, by the processor circuitry, the read request as critical based on a detection that the read request corresponds to an oldest instruction in an instruction cache miss queue of the processor circuitry.

13. A system, comprising:

processor circuitry that includes cache circuitry configured to issue memory requests and assign one of a plurality of criticality values to a given one of the memory requests; and a memory system configured to couple to one or more memory devices and to receive ones of the memory requests, wherein the memory system is configured to:

perform a first turn in which a plurality of memory requests of a first request type are processed;

receive, during the first turn, a memory request of a second request type;

issue, upon the reception of the memory request, a request to the processor circuitry to provide a criticality value of the memory request;

based on the criticality value of the memory request, transition, to process the memory request, from the first turn to a second turn without completing the first turn; and perform the second turn in which a plurality of memory requests of the second request type are processed.

14. The system of claim 13, wherein the memory system includes a set of queues configured to store memory requests of the first request type, wherein the memory system is configured to manage the set of queues based on a pool of credits, and wherein the memory system is configured to transition from the first turn to the second turn without completing the first turn based on the criticality value and a detection that a set of activation criteria is satisfied, wherein the set of activation criteria includes a criterion that there is at least a threshold number of credits available in the pool of credits.

15. The system of claim 13, wherein the plurality of criticality values includes a critical value and at least one non-critical value, and wherein the processor circuitry further comprises:

memory management circuitry that is configured to translate virtual memory addresses to physical memory addresses, wherein the cache circuitry is configured to assign the critical value to the memory request based on a detection that the memory request corresponds to a transaction of the memory management circuitry.

16. The system of claim 13, wherein the memory system includes a set of queues configured to store memory requests of the second request type, and wherein the memory system is configured to, during the second turn, process the memory requests in the set of queues in an order in which the memory requests of the second request type are stored.

17. The system of claim 13, wherein the plurality of memory requests of the first request type are write requests and the plurality of memory requests of the second request type are read requests.

* * * * *